(12) United States Patent
Pabich et al.

(10) Patent No.: US 7,669,454 B2
(45) Date of Patent: Mar. 2, 2010

(54) PRESS BRAKE TOOL HOLDER INCORPORATING TOOL-SEATING MECHANISM

(75) Inventors: Terry G. Pabich, Roberts, WI (US); Thomas S. Duppong, Lake Elmo, MN (US); Ken J. Wilson, White Bear Lake, MN (US); Bryan L. Rogers, Forest Lake, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 0 days.

(21) Appl. No.: 11/972,887

(22) Filed: Jan. 11, 2008

(65) Prior Publication Data

US 2008/0307850 A1    Dec. 18, 2008

Related U.S. Application Data

(63) Continuation of application No. 11/178,977, filed on Jul. 11, 2005, now Pat. No. 7,596,983.

(51) Int. Cl.
*B21D 37/04* (2006.01)
*B21D 37/14* (2006.01)

(52) U.S. Cl. .................. 72/481.1; 72/481.2; 72/482.2; 72/482.91

(58) Field of Classification Search ............... 72/465.1, 72/481.1, 481.2, 481.3, 482.2
See application file for complete search history.

(56) References Cited

U.S. PATENT DOCUMENTS

| | | | |
|---|---|---|---|
| 3,584,497 A | 6/1971 | Pohjola | |
| 3,889,515 A | 6/1975 | Grombka | |
| 3,965,721 A | 6/1976 | Roch | |
| 4,137,748 A | 2/1979 | Grombka | |
| 4,315,425 A | 2/1982 | Zbornik | |
| 4,354,374 A | 10/1982 | Deguchi | |
| 4,506,538 A | 3/1985 | Jones, Jr. | |
| 4,535,689 A | 8/1985 | Putkowski | |
| 4,586,361 A | 5/1986 | Reinhorn | |
| 4,612,796 A | 9/1986 | Smyth, Jr. | |
| 4,653,307 A | 3/1987 | Zbornik | |
| 4,721,293 A | 1/1988 | Schron | |
| 4,736,612 A | 4/1988 | Russell | |
| 4,895,014 A | 1/1990 | Houston | |

(Continued)

FOREIGN PATENT DOCUMENTS

DE    41 15 224    11/1992

(Continued)

OTHER PUBLICATIONS

Wila Press Brake Productivity Guide, Jun. 2005, 217 pages.

(Continued)

*Primary Examiner*—David B Jones
(74) *Attorney, Agent, or Firm*—Fredrikson & Byron, P.A.

(57) ABSTRACT

Press brake tool holders suitable for holding press brake tools for punching and/or otherwise deforming workpieces, such as sheet metal. Provided in some embodiments is a press brake tool holder. Some embodiments provide the tool holder in combination with a press brake tool. Methods of using press brake tool holders are also provided. In certain embodiments, the tool holder has a tool-seating mechanism adapted for moving a tool parallel to a pressing axis of the tool holder.

33 Claims, 32 Drawing Sheets

U.S. PATENT DOCUMENTS

| | | | |
|---|---|---|---|
| 4,993,255 | A | 2/1991 | Treillet |
| 5,009,098 | A | 4/1991 | van Merksteijn |
| 5,022,256 | A | 6/1991 | van der Meulen |
| 5,065,610 | A | 11/1991 | Yonezawa |
| 5,121,626 | A | 6/1992 | Baldwin |
| 5,245,854 | A | 9/1993 | Bruggink |
| 5,390,527 | A | 2/1995 | Kawano |
| 5,507,170 | A | 4/1996 | Kawano |
| 5,511,407 | A | 4/1996 | Kawano |
| 5,513,514 | A | 5/1996 | Kawano |
| 5,562,892 | A | 10/1996 | Kirk |
| 5,572,902 | A | 11/1996 | Kawano |
| 5,619,885 | A | 4/1997 | Kawano |
| 5,642,642 | A | 7/1997 | Kawano |
| 5,685,149 | A | 11/1997 | Schneider |
| 5,685,191 | A | 11/1997 | Kawano |
| 5,720,169 | A | 2/1998 | Schneider |
| 5,794,486 | A * | 8/1998 | Sugimoto et al. ......... 72/481.3 |
| 5,822,989 | A | 10/1998 | Sturdevant |
| 6,000,273 | A | 12/1999 | Stover |
| 6,003,360 | A | 12/1999 | Runk |
| 6,018,979 | A | 2/2000 | Davis |
| 6,109,602 | A | 8/2000 | Schron |
| 6,151,951 | A | 11/2000 | Kawano |
| 6,241,231 | B1 | 6/2001 | Schron |
| 6,446,485 | B1 | 9/2002 | Tarasconi |
| 6,450,004 | B1 | 9/2002 | Edmondson |
| 6,467,327 | B1 | 10/2002 | Runk |
| 6,481,204 | B1 | 11/2002 | Yuschak |
| 6,522,953 | B1 | 2/2003 | Schneider |
| 6,564,611 | B2 | 5/2003 | Harrington |
| 6,644,090 | B2 | 11/2003 | Gasparini |
| 6,848,291 | B1 | 2/2005 | Johnson |
| 7,021,116 | B2 | 4/2006 | Harrington |
| 7,069,766 | B2 * | 7/2006 | Hayashi et al. ............ 72/481.3 |
| 7,096,708 | B2 * | 8/2006 | Gascoin ..................... 72/482.2 |
| 7,152,453 | B2 * | 12/2006 | Johnson et al. ............ 72/481.1 |
| 7,308,817 | B2 * | 12/2007 | Shimota et al. ............ 72/482.1 |
| 7,343,774 | B2 * | 3/2008 | Gascoin et al. ............ 72/482.2 |
| 2002/0023477 | A1 | 2/2002 | Gianelli |
| 2004/0163442 | A1 | 8/2004 | Gascoin |
| 2004/0187552 | A1 | 9/2004 | Enderink |
| 2007/0006635 | A1 | 1/2007 | Pabich |

FOREIGN PATENT DOCUMENTS

| | | |
|---|---|---|
| DE | 19845386 | 5/2000 |
| EP | 0 494 714 | 7/1992 |
| EP | 0 644 002 | 3/1995 |
| EP | 1493506 | 1/2005 |
| FR | 2122977 | 1/1972 |
| FR | 2809976 | * 12/2001 |
| JP | 10-323720 | 12/1998 |
| JP | 2003 191016 | 7/2003 |
| JP | 2003 200219 | 7/2003 |
| WO | WO 02/092253 | 11/2002 |
| WO | WO 2004/024361 | 3/2004 |
| WO | WO 2004/101188 | 11/2004 |

OTHER PUBLICATIONS

"New Standard Clamping" from www.wila.nl, printed Mar. 3, 2005 (four pages from www.wila.nl/English/clamping/ProductInfo_NS.htm; one page from www.wila.nl/images/dia-8-eng.gif; one page from www.wila.nl/images/dia-4-eng.gif; one page from www.wila.nl/images/dia-5-eng.gif; one page from www.wila.nl/images/diz-17-eng.gif, and four previously printed pages ("New Standard") from www.wila.nl.

TCAM T-Vise Operator's Manual, TCAM Power Workholding, LLC., publ. 2001.

"U.S. Appl. No. 11/178,977, Non Final Office Action mailed May 23, 2008", 6 pgs.

"U.S. Appl. No. 11/178,977, Response to Non Final Office Action dated Nov. 24, 2008", 23 pgs.

An English-language translation of DE 41 15 224 (Machinefabriek).

English-language abstract for DE19845386 (SMU Edelmann).

An English-language translation of FR 2122977.

English-language abstract for JP 10-323720 (Amada Metrecs Co).

English-language abstract for JP 2003 191016 (Amada Medtrecs Co).

English-language abstract for JP 2003 200219 (Tiger Kosan).

English-language abstract for WO 2004/101188 (Trumpf Maschinen).

An English-language translation of WO 2004/024361 (Trumpf Maschinen).

International Search Report, dated Nov. 23, 2006 for PCT Application No. PCT/US2006/027064, 8 pages.

Written Opinion, dated Nov. 12, 2006 for PCT Application No. PCT/US2006/027064, 6 pages.

* cited by examiner

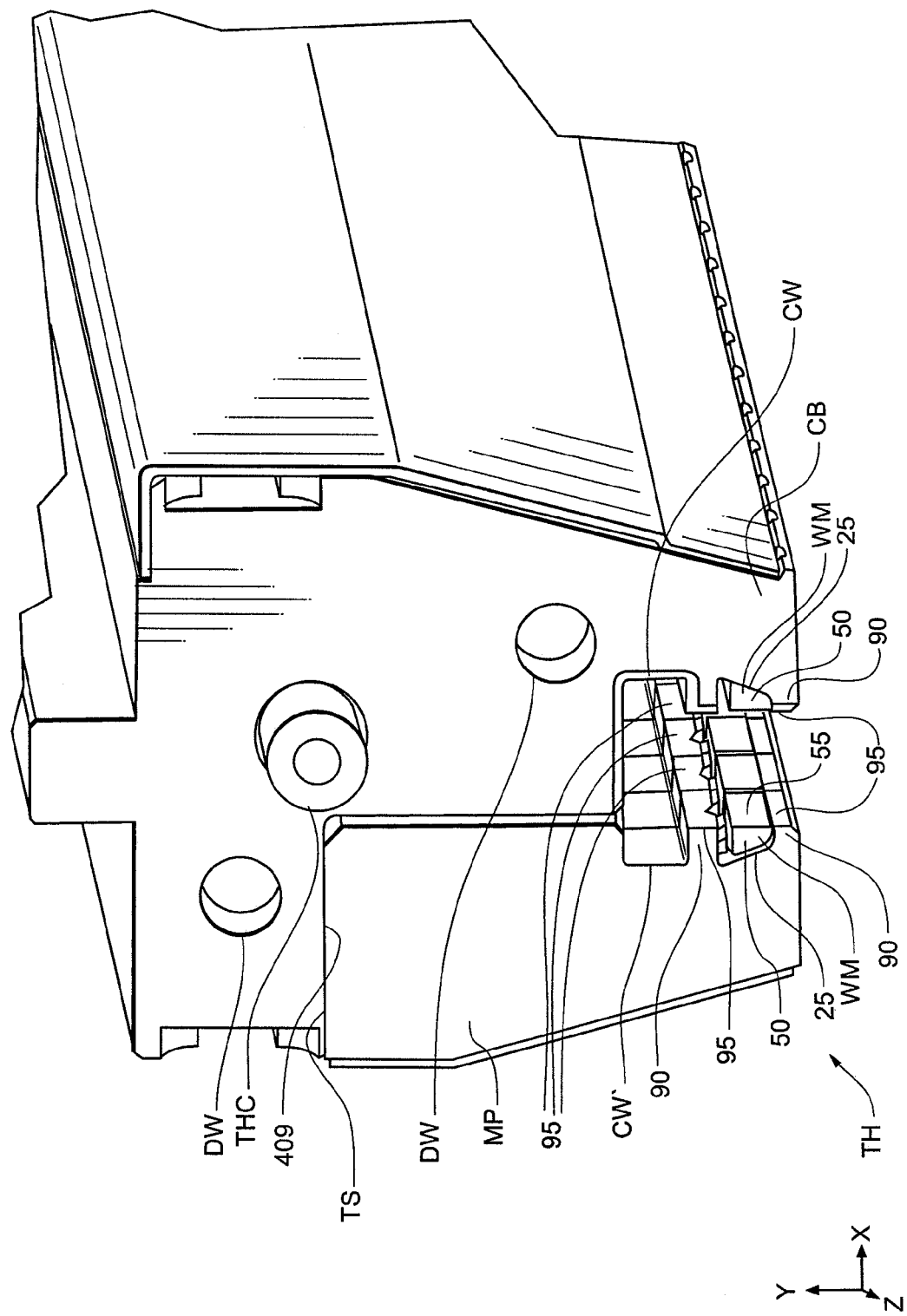

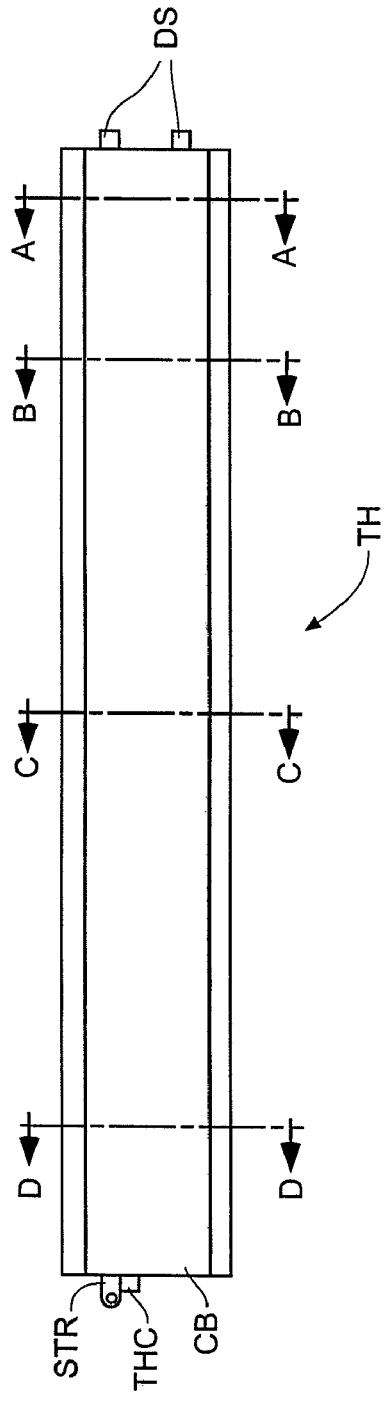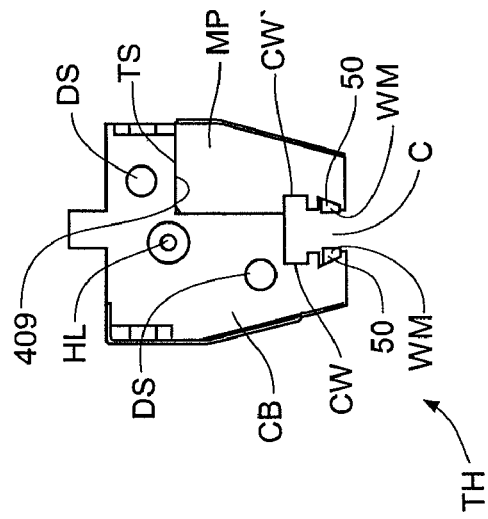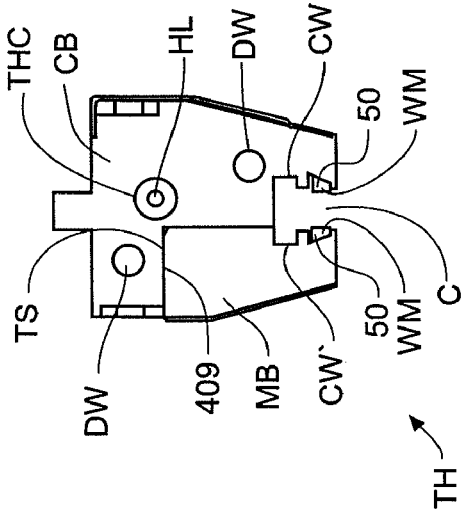

PRESS BRAKE TOOL HOLDER INCORPORATING TOOL-SEATING MECHANISM

RELATED APPLICATIONS

This is a continuation application of, and claims priority to, International Application No. PCT/US2006/027064 filed Jul. 11, 2006, the teachings of which are incorporated herein by reference, and also claims priority to U.S. patent application Ser. No. 11/178,977 filed Jul. 11, 2005.

FIELD OF INVENTION

The present invention relates generally to industrial presses. More particularly, this invention relates to press brakes.

BACKGROUND OF INVENTION

Press brakes are commonly used to bend or otherwise deform sheet-like workpieces, such as sheet metal workpieces. A conventional press brake has an upper beam and a lower beam, at least one of which is movable toward and away from the other. Typically, the upper beam is movable vertically while the lower beam is fixed in a stationary position. It is common for a male forming punch and a female forming die to be mounted respectively on the upper and lower beams of a press brake.

Typically, the punch has a downwardly oriented, workpiece-deforming surface (or "tip"). The configuration of this surface is dictated by the shape into which it is desired to deform a workpiece. The die typically has a recess (bounded by one or more workpiece-deforming surfaces) that is aligned with the tip of the punch. The configuration of this recess corresponds to the configuration of the punch's tip. Thus, when the beams are brought together, a workpiece between them is pressed by the punch into the die to give the workpiece a desired deformation (e.g., a desired bend).

In order to accurately deform a workpiece, it is necessary for the tools to be mounted securely on the tool holder. This is accomplished by forcibly clamping the tool holder about each tool. Multiple steps are sometimes required, for example, to mount a punch on the upper beam of a press brake. The punch may be moved into an initial-mount position by lifting the shank of the punch upwardly between a support plate and clamp of the tool holder. In some cases, when the punch is moved into this position, a safety key of the punch engages a safety slot of the tool holder. In other cases, a safety groove on the punch is engaged by a lip on the clamp of the tool holder. Either way, the tool holder subsequently is clamped forcibly on the shank of the punch. Even at this stage, the load-bearing surfaces of the tool holder and punch may not be securely engaged. Rather, additional steps may be required. For example, with many tool holder designs, the upper and lower tables of the press brake must subsequently be moved together until the punch comes into contact with a die on the lower table. By forcing the tip of the punch against the die, the punch can be urged upwardly relative to the tool holder until the load-bearing surface(s) of the punch is/are moved into contact with the corresponding load-bearing surface(s) of the tool holder. When a punch is in this operative position, the load-bearing surfaces of the tool holder and punch are engaged and the shank of the punch is forcibly clamped, e.g., between a support plate and clamp of the tool holder. During pressing operations, the punch is maintained in this position.

Thus, it can be appreciated that several steps may be required to operatively mount a punch on the upper beam of a press brake.

It would be desirable to provide a tool holder that can be operatively clamped about a tool in such a way that the load-bearing surfaces of the tool holder and tool are engaged as an adjunct of the closing action of the tool holder on the tool (e.g., without having to press the tip of a preliminarily-clamped punch against a die on the lower table of the press brake). It would be particularly desirable to provide a tool holder that offers tool-seating functionality and can be used with a wide variety of tooling styles. The present invention provides new press brake tool holder technologies, in which a tool-seating mechanism is incorporated into the tool holder.

SUMMARY OF INVENTION

Some press brake tool holders are limited in terms of the tooling styles they are able to accommodate. This is the case, for example, with certain tool holders that offer tool-seating functionality. The present invention, in some embodiments, provides a tool holder having a tool-seating mechanism that can be used with a wide variety of different tooling styles. In such embodiments, this is advantageous in that the operator of such a tool holder is able to use tools of many different styles without having to provide an adaptor or the like for the tool holder.

In certain embodiments, the invention provides a tool holder for a press brake. The tool holder is adapted to move a press brake tool along a pressing axis when the tool is operatively mounted on the tool holder. The tool holder has two spaced-apart confronting walls bounding a tool-mount channel configured for receiving a shank of the tool. In the present embodiments, the walls have clamping surfaces for engaging and clamping the tool's shank there between. Preferably, the tool holder includes confronting movable seating members disposed on opposite sides of the tool-mount channel, the seating members being adapted to engage opposite sides of the tool's shank and to move together with the shank in a direction at least generally parallel to the tool holder's pressing axis in response to a first of the two walls moving toward a second of the two walls.

In certain embodiments, the invention provides a method of mounting a press brake tool on a tool holder having a tool-mount channel bounded by two spaced-apart confronting walls. The walls have clamping surfaces for engaging and clamping a shank of the tool there between as a first of the walls is moved toward a second of the walls. The tool holder is adapted for moving the tool when operatively mounted on the tool holder along a pressing axis. In the present embodiments, the tool holder has confronting movable seating members disposed on opposite sides of the tool-mount channel. The method comprises positioning the tool's shank in the tool-mount channel, moving the first wall toward the second wall such that the seating members engage opposite sides of the tool's shank, and moving the thus engaged seating members together with the tool's shank in a direction at least generally parallel to the tool holder's pressing axis.

In certain embodiments, the invention provides a tool holder for a press brake. The tool holder is adapted to move a press brake tool along a pressing axis when the tool is operatively mounted on the tool holder. The tool holder has two spaced-apart confronting walls bounding a tool-mount channel configured for receiving a shank of the tool. In the present embodiments, the tool holder has first and second moveable seating members disposed on opposite sides of the tool-mount channel. In the present embodiments, the first and second seating members are adapted to respectively engage first and second sides of the tool's shank and to move together with the shank in a direction at least generally parallel to the tool holder's pressing axis in response to a first of the two walls moving toward a second of the two walls.

In certain embodiments, the invention provides a tool holder for a press brake. The tool holder is adapted to move a press brake tool in a pressing direction when the tool is operatively mounted on the tool holder. The tool holder has two spaced-apart confronting walls bounding a tool-mount channel. In the present embodiments, the tool holder has a moveable seating member mounted on one of the confronting walls. This seating member has a contact surface that comes into direct contact with a side of the tool's shank when the shank is received in the tool-mount channel and a first of the two walls is moved toward a second of the two walls. The contact surface once moved into direct contact with the side of the tool's shank delivers a frictional force to the tool's shank. The frictional force is oriented in a seating direction (e.g., in a vertical direction) at least generally opposed to the tool holder's pressing direction. Preferably, this frictional force is the only seating force (e.g., the only upward component of force) applied by the seating member to the tool when the tool's shank is received in the tool-mount channel and the first wall is moved toward the second wall.

In certain embodiments, the invention provides a tool holder for a press brake. The tool holder is adapted to move a press brake tool along a pressing axis when the tool is operatively mounted on the tool holder. The tool holder has two spaced-apart confronting walls bounding a tool-mount channel. In the present embodiments, the tool holder includes a clamp that is moveable between open and closed positions. Preferably, the tool holder includes a moveable seating member mounted on one of the confronting walls. In the present embodiments, when a shank of the tool is received in the tool-mount channel and the clamp is moved from its open position to its closed position the seating member engages the tool's shank and moves together with the shank in a direction at least generally parallel to the tool holder's pressing axis until a load-receipt surface of the tool engages a load-delivery surface of the tool holder. In the present embodiments, the tool holder can optionally include a spring member resiliently biasing the clamp toward its closed portion.

In certain embodiments, the invention provides a tool holder for a press brake. The tool holder is adapted to move a press brake tool in a pressing direction when the tool is operatively mounted on the tool holder. The tool holder has two spaced-apart confronting walls bounding a tool-mount channel. In the present embodiments, the tool holder has a moveable seating member mounted on one of the confronting walls, and the seating member has a contact surface that comes into direct contact with a side of the tool's shank during a closing of the tool holder on the tool's shank. In the present embodiments, the contact surface is defined at least in part (optionally substantially entirely by) by a polymer.

In certain embodiments, the invention provides a tool holder for a press brake. The tool holder is adapted to move a press brake tool along a pressing axis when the tool is operatively mounted on the tool holder. The tool holder has two spaced-apart confronting walls bounding a tool-mount channel configured for receiving a shank of the tool. In the present embodiments, the tool holder includes moveable seating members disposed on opposite sides of the tool-mount channel. In these embodiments, the seating members preferably are adapted to engage opposite sides of the tool's shank and to move together with the shank in a direction at least generally parallel to the tool holder's pressing axis in response to a first of the two walls moving toward a second of the two walls. In the present embodiments, the seating members are adapted to bear against, and cam with, respective cam surfaces of the tool holder during this conjoint movement of the seating members and the tool's shank. Further, in the present embodiments, the cam surfaces of the tool holder are defined by bodies (optionally a tool holder block and a moveable face plate) comprising or consisting essentially of a first material, the seating members comprise a second material, and the first and second materials are different. Optionally, the first material comprises a steel and the seating members are formed of material having a lesser hardness than the steel. The second material can optionally comprise a polymer. In some cases, the seating members consist essentially of polymer and filler.

In certain embodiments, the invention provides a tool holder for a press brake. The tool holder is adapted to move a press brake tool along a pressing axis when the tool is operatively mounted on the tool holder. The tool holder has two spaced-apart confronting walls bounding a tool-mount channel configured for receiving a shank of the tool. In the present embodiments, the walls have clamping surfaces for engaging and clamping the tool's shank therebetween. In the present embodiments, the clamping surfaces of the tool holder preferably are defined by metal (optionally steel) over which coating is provided. The coating can optionally comprise nitrogen and/or carbon. In the present embodiments, the seating members can optionally comprise a polymer. In some cases, they consist essentially of the polymer and a filler.

In certain embodiments, the invention provides a tool holder for a press brake. The tool holder is adapted to move a press brake tool in a pressing direction when the tool is operatively mounted on the tool holder. The tool holder has two spaced-apart confronting walls bounding a tool-mount channel. The tool holder has a moveable seating member mounted on one of the confronting walls. In the present embodiments, the seating member has a contact surface adapted to directly contact a side of the tool's shank. In the present embodiments, the seating member has a camming surface adapted to bear against, and cam with, a cam surface of the tool holder. Preferably, in the present embodiments, the cam surface of the tool holder is defined by metal (optionally a steel) over which coating is provided. The coating can optionally comprise nitrogen and/or carbon. The camming surface of the seating member can optionally be defined at least in part by a polymer. For example, the seating member can optionally consist essentially of the polymer and a filler.

BRIEF DESCRIPTION OF THE DRAWINGS

FIG. 25 is a partially broken-away perspective view of a tool holder in accordance with certain embodiments of the invention;

FIG. 30 is a front view of a tool holder in accordance with certain embodiments of the invention;

FIG. 30A is one side end view of the tool holder of FIG. 30;

FIG. 30B is another side end view of the tool holder of FIG. 30;

DETAILED DESCRIPTION OF PREFERRED EMBODIMENTS

The invention in some embodiments provides a brake press tool holder TH. Generally, the tool holder TH defines a channel C configured for receiving the shank of a press brake tool. This channel C is referred to herein as the tool-mount channel. In some embodiments, the tool-mount channel C has a generally T-shaped cross section, although this is by no means required. Preferably, at least part of the channel C is bounded by two confronting walls CW, CW' of the tool holder. Optionally, the confronting walls CW, CW' are at least generally vertical and/or each define at least one surface that is at least substantially vertical and planar. These features, however, are not required. For example, the configuration and construction of the walls CW, CW' bounding the tool-mount channel C will vary depending upon the particular style in which the tool holder is embodied.

The tool holder TH will commonly be adapted for use with American style tools. However, the tool holder can take the form of various other tool holder styles known in the art, including those currently in less widespread use. Moreover, the tool holder TH can be adapted for use with tooling styles that are not yet developed but would benefit from the features of this invention. The tool holder, of course, can be a press brake beam, an adaptor mounted to a press brake beam, or any other type of press brake tool holder.

Some embodiments of the invention provide a tool holder TH in combination with a press brake tool TL. The press brake tool TL can be a male forming punch or a female forming die. Typically, the tool TL has generally opposed first and second ends (or sides). The first end (or side) of the tool preferably defines a workpiece-deforming surface (e.g., at a tip of the tool) configured for making a desired deformation (e.g., a bend) in a workpiece when this surface is forced against the workpiece (e.g., when a tip of the tool is forced against a piece of sheet metal or the like). The second end (or side) of the tool has a shank (or "tang") S configured for being mounted in (e.g., sized and shaped to be received in) the tool-mount channel C.

Figure 14:
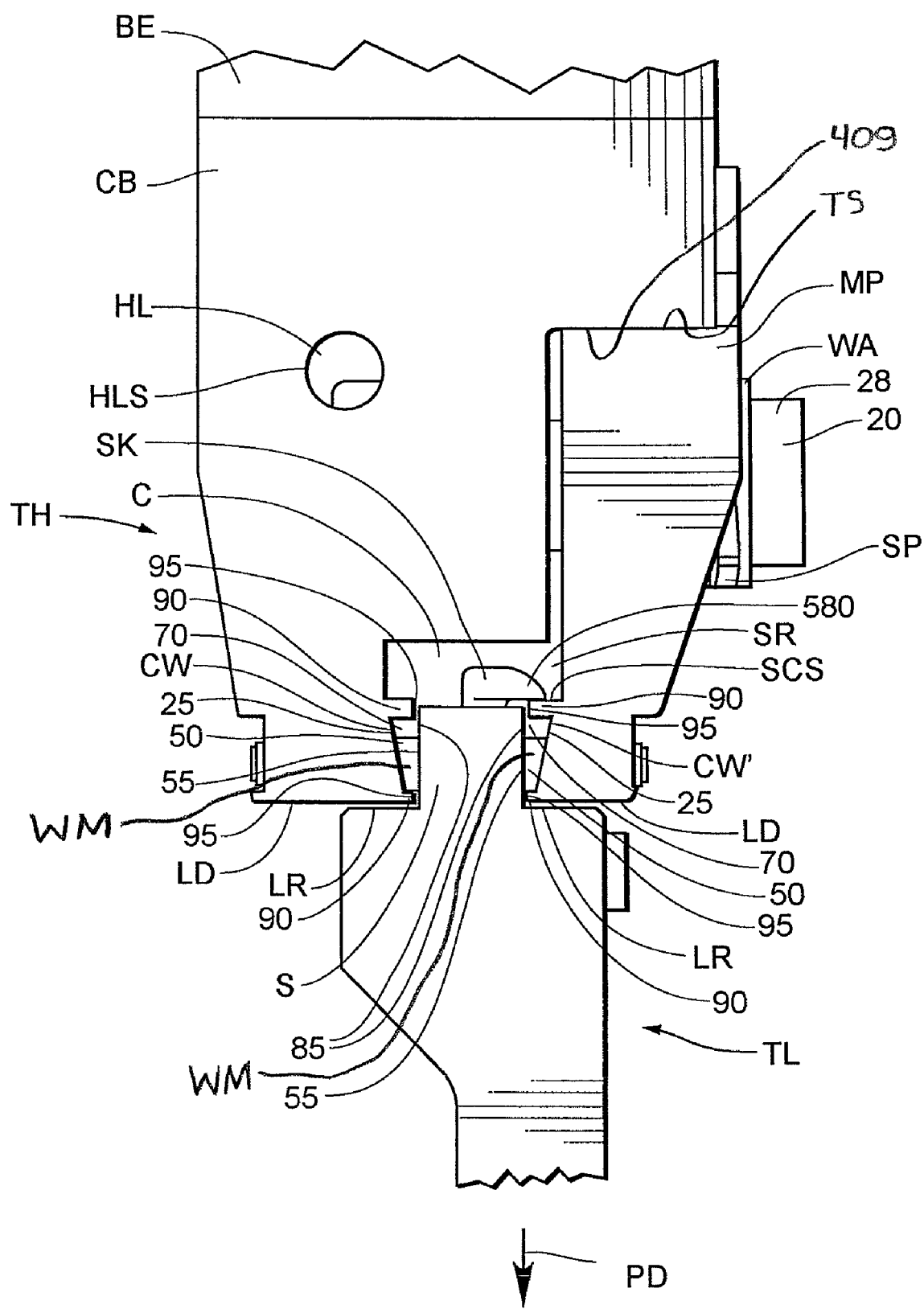
FIG. 14 is a side view of a tool on a tool holder in accordance with certain embodiments of the invention.
Figure 15:
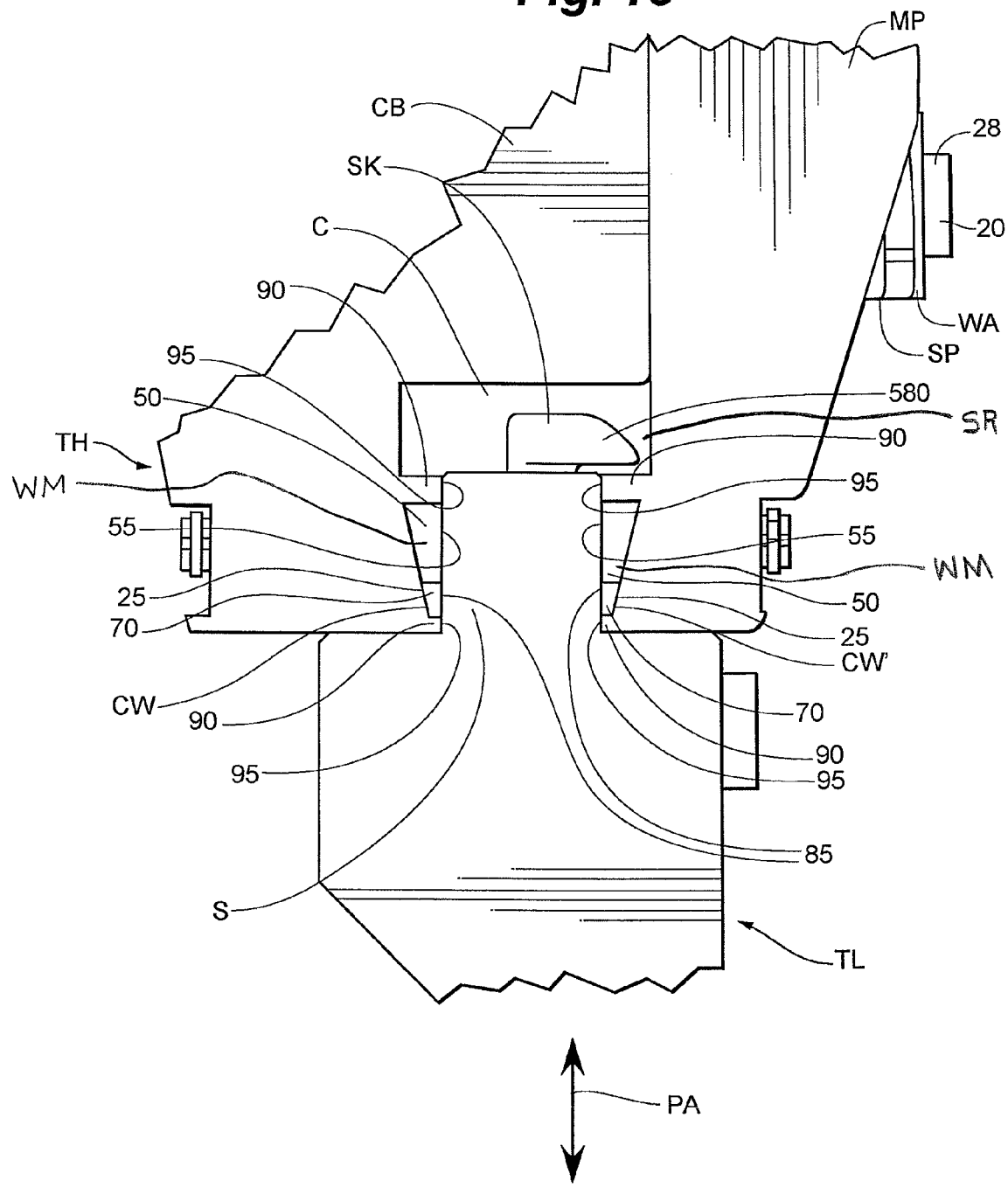
FIG. 15 is a partially broken-away side view of a tool on a tool holder, the tool being shown in its operatively-clamped position, in accordance with certain embodiments of the invention.

In some cases, the tool TL has a safety key SK. As shown in FIGS. 14 and 15, the shank S of the tool TL can optionally have a safety key SK adapted for engaging a safety recess (or "safety groove") SR, and/or moving into alignment with a safety shelf SCS, defined by the tool holder TH. When provided, the safety key SK can be retractable or non-retractable. Safety keys of both types are described in U.S. Pat. No. 6,467,327 (Runk et al.), and U.S. patent application Ser. No. 10/742,439, entitled "Press Brake Tooling Technology", the entire contents of each of which are incorporated herein by reference.

In embodiments involving a tool TL with a safety key SK, the key preferably comprises an engagement portion 580 that is adapted to project into a safety recess SR (and/or into alignment with a safety shelf SCS) defined by the tool holder TH. In the case of a non-retractable safety key, the key will typically comprise a rigid projection from the tool's shank. When provided, the non-retractable safety key preferably is either integral to the tool's shank or rigidly joined to the tool's shank.

In the case of a retractable safety key, the key is mounted on the tool so as to be moveable between an extended position and a retracted position. In more detail, such a key preferably comprises a rigid engagement portion 580 that is moveable (e.g., laterally) relative to (e.g., generally toward and away from) the tool's shank (or at least relative to stationary portions of the shank). Such retractable safety keys are described in U.S. Pat. No. 6,467,327 and U.S. patent application Ser. No. 10/742,439. In some cases, the safety key is part of a key assembly (e.g., mounted inside and/or on the tool) comprising at least one spring member resiliently biasing (directly or via one or more link members and/or other bodies) the safety key SK toward its extended position.

Thus, in some embodiments, the tool holder defines a safety recess SR. When provided, the safety recess SR is sized to receive an engagement portion 580 of a desired safety key SK. In some embodiments involving a tool TL with its shank S received in the channel C of a tool holder TH, the tool holder has a safety recess SR that is at the same elevation as a safety key SK (or at least an engagement portion thereof) on the tool. Some embodiments of this nature provide a tool TL having a safety key SK projecting generally away from the shank S of the tool and engaged with (e.g., extending into) the safety recess SR of the tool holder TH, such that an engagement portion 580 of the safety key is received in the safety recess (and is positioned directly above a safety shelf SCS of the tool holder). Reference is made to FIGS. 14 and 15.

Thus, certain embodiments provide a tool holder TH and tool TL in combination. In these embodiments, the second end of the tool (e.g., the shank S) is received in the tool holder's channel C. As noted above, the channel C is typically bounded (at least in part) by two confronting walls CW, CW' of the tool holder. In combination embodiments, the tool's first end (which typically defines a tip) projects (e.g., generally vertically) away from the tool holder.

Generally, the tool holder TH has at least one load-delivery surface LD configured for engaging a load-receipt surface LR of a press brake tool TL. Preferably, the tool holder TH has one or more generally or substantially horizontal load-delivery surfaces LD each being adapted to engage and deliver force to (when the tool is operatively mounted on the tool holder) one or more corresponding generally or substantially horizontal load-receipt surfaces LR of the tool TL. In some embodiments involving a tool in combination with (and operatively mounted on) a tool holder, the tool holder has a load-delivery surface LD engaged with (e.g., carried directly against) a load-receipt surface LR of the tool TL. Preferably, these engaged surfaces LD, LR are generally or substantially horizontal. In some cases, the tool holder TH has two horizontal load-delivery surfaces LD. For example, FIGS. 1, 2, 4-7, and 14-21 depict tool holders of this nature, wherein two load-delivery surfaces LD are separated by an opening of the tool-mount channel C. Here, the channel C is depicted as being downwardly open. The invention, however, also provides embodiments where the channel C is upwardly open (e.g., embodiments where the tool holder is used to secure a die on the lower beam of a press brake).

The illustrated load-delivery surfaces LD of the tool holder are configured for engaging, and delivering force to, corresponding load-receipt surfaces LR of a tool TL. In FIGS. 14 and 15, the horizontal load-delivery surfaces LD of the illustrated tool holder TH are shown as downwardly facing surfaces, and the horizontal load-receipt surfaces LR of the tool TL are shown as upwardly facing surfaces. In other embodiments (e.g., where the tool holder is on a lower beam), the horizontal load-delivery surface(s) LD of the tool holder is/are upwardly facing, and the horizontal load-receipt surface(s) of the tool is/are downwardly facing. Thus, the invention provides various combination embodiments wherein the shank of a tool is operatively mounted in the channel of the tool holder such that each load-delivery surface of the tool holder is generally or substantially horizontal and is carried directly against a corresponding generally or substantially horizontal load-receipt surface of the tool.

In certain embodiments, the tool holder TH is adapted for forcing a tool TL (e.g., when the tool is operatively mounted on the tool holder) against a workpiece by delivering force from the load-delivery surface(s) LD of the tool holder to the load-receipt surface(s) LR of the tool. In preferred embodiments of this nature, the tool holder TH is adapted for moving the operatively mounted tool TL along a pressing axis PA (shown in FIG. 15), e.g., during a pressing operation. For example, the tool holder TH can optionally be adapted for moving the tool TL in a pressing direction PD (shown in FIG. 14) that is generally or substantially normal to the load-delivering surface(s) LD of the tool holder. In preferred embodiments of this nature, each load-delivering surface LD of the tool holder TH is generally or substantially horizontal, and the tool holder is adapted for moving the tool TL in a generally or substantially vertical direction. For example, the tool holder can advantageously be adapted for moving the tool vertically into and out of engagement with a workpiece WP (e.g., when the workpiece is secured in a workpiece location WL between upper and lower tables of the press brake).

In some embodiments, the tool holder is operably coupled to a press brake ram that is adapted for moving the tool holder and the operatively mounted tool together so as to force the workpiece-deforming surface of the tool against a workpiece. Preferably, the ram (which can be incorporated into, or otherwise operably coupled with, a bed BE of the press brake) is adapted for moving the tool holder TH and tool TL together in a pressing direction PD that is generally or substantially normal to the load-delivering surface(s) LD of the tool holder (e.g., in a vertical direction). In other embodiments, the tool holder TH is not adapted for moving the operatively mounted tool, but rather is designed for securing the tool in a stationary position during pressing operations.

Preferably, the tool holder TH has a closed configuration and an open configuration. When the tool holder TH is in its open configuration, it is possible to move the shank S of a press brake tool TL into and out of the tool holder's channel C. When the tool holder TH is in its closed configuration, the shank S of a tool TL mounted in the tool holder's channel C is clamped securely, and held rigidly, against (at least part of) a wall CW of the tool holder.

The tool holder TH can optionally have a moveable face plate MP, jaw, or other clamp, which preferably defines at least part of one CW' of the confronting walls CW, CW'. When such a tool holder moves to its closed configuration, the moveable plate MP, jaw, etc. desirably moves (at least in part) toward the other confronting wall CW (i.e., the "second" wall). On the other hand, when such a tool holder moves to its open configuration, the moveable plate MP, jaw, etc. desirably moves (at least in part) away from the other confronting wall CW. The illustrated embodiments, for example, provide a moveable face plate MP that defines the first wall CW' and can be moved selectively toward or away from the tool holder block CB that defines the second wall CW. The illustrated block CB is adapted for staying in a stationary lateral position during movement of the tool holder from its open configuration to its closed configuration, although this is not required. The moveable face plate design described in this paragraph is merely one fashion in which the tool holder can be embodied so as to have a clamp that can be moved selectively between open and closed positions.

Preferably, the tool holder TH is adapted for moving a press brake tool TL along a pressing axis PA when the tool is operatively mounted on the tool holder. As noted above, the tool holder TH has two spaced-apart confronting walls CW, CW' bounding a tool-mount channel C that is configured for receiving a shank S of the tool TL. Preferably, the walls CW, CW' have (e.g., define) clamping surfaces 95 that are adapted for engaging and clamping the tool's shank S therebetween. That is, each wall CW, CW' preferably has at least one such clamping surface 95, although alternate embodiments involve a tool holder wherein only one of the walls CW, CW' has such a clamping surface. In certain preferred embodiments, the tool holder TH also has movable seating members 50 disposed on opposite sides of the tool-mount channel C. The seating members 50 are adapted to engage opposite sides of the tool's shank S and thereafter move together with the shank in a direction at least generally parallel to the tool holder's pressing axis PA, e.g., in response to the first wall CW' (or at least a part thereof) moving toward the second wall CW at such time as the tool's shank is positioned in the tool-mount channel C.

Thus, when the tool holder TH closes on the shank S of a tool TL, seating members 50 preferably engage opposite sides of the tool's shank S. Once the preferred seating members 50 initially make contact with the tool's shank S, continued movement of the first wall CW' toward the second wall CW causes the seating members to move (e.g., relative to portions of the tool holder that are stationary during such closing action) together with the tool's shank in a direction at least generally parallel to the tool holder's pressing axis PA. This movement of the seating members 50 together with the tool's shank S is referred to herein as "conjoint movement." Preferably, the seating members 50 do not move (at least not substantially) relative to the tool's shank S during this conjoint movement. In some embodiments, the conjoint movement ends when the load-receipt surface(s) LR of the tool comes into direct contact with the corresponding load-delivery surface(s) LD of the tool holder. After such engagement of the load-bearing surfaces LD, LR of the tool and tool holder, continued movement of the first wall CW' toward the second wall CW causes (in certain embodiments) camming surfaces 325 of the seating members 50 to continue camming with corresponding cam surfaces 25 of the tool holder, which causes the seating members (e.g., contact surfaces 55 thereof) to slide relative to (e.g., upwardly along) the tool's shank, optionally until clamping surfaces 95 of the tool holder clamp forcibly on the tool's shank.

In some cases, the tool holder's channel C opens toward a workpiece location WL (shown in FIG. 6) and the tool holder TH is configured such that the conjoint movement of the seating members 50 and the tool's shank S is movement away from (e.g., at least generally away from, such as directly away from) the workpiece location. For example, when the tool holder TH is part of, and/or is on, the upper beam of the press brake, the conjoint movement desirably is upward vertical movement.

Preferably, when the first wall CW' (or at least a part thereof) is moved toward the second wall CW, a tool shank S in the channel C is engaged by seating members 50 and forced to move in a desired direction (e.g., upwardly) until the load-bearing surfaces LD, LR of the tool holder TH and tool TL come into direct contact with one another. In other words, the tool TL preferably is fully seated as an adjunct of the tool holder's closing action. In more detail, the tool holder TH preferably comprises a load-delivery surface LD, the tool TL preferably includes a load-receipt surface LR, and in response to (at least part of) the first wall CW' moving toward the second wall CW the seating members 50 once engaged with the tool's shank S preferably move together with the shank in a direction at least generally parallel to the pressing axis (e.g., vertically) until the load-receipt surface of the tool comes into direct contact with the load-delivery surface of the tool holder. It is to be appreciated that the tool and tool holder can optionally each have two or more load-bearing surfaces, as discussed above.

When the preferred seating members 50 engage the tool's shank S, they bear forcibly on the shank. The resulting normal force (which preferably is oriented in a direction at least generally perpendicular to the tool holder's pressing axis) on the tool's shank creates a frictional force that is delivered from the seating members to the shank. In certain preferred embodiments, this frictional force is greater than the weight of the tool TL. This will commonly be preferred when the tool holder is part of, and/or is on, the upper beam of the press brake. In such embodiments, the tool will be lifted toward its seated position as a result of (optionally due only to) the frictional force.

In embodiments involving two seating members 50 disposed on opposite sides of the tool-mount channel C, the seating members can be provided in various different configurations. The seating members 50, for example, can be wedge members WM (as exemplified in FIGS. 1-7, 11, 12, 14, 15, 18, 19, 22, 23, 24A, 24B, 25-28, 30A, 30B, and 32-36) and/or rod members RM (as exemplified in FIGS. 16, 17, 20, and 21). Other seating member configurations can also be used. Moreover, the invention provides certain embodiments wherein seating members are not provided on both sides of the channel C. Exemplary embodiments of this nature are perhaps best appreciated in FIG. 19 (of which more will be said later).

In the illustrated embodiments, each seating member 50 preferably has a contact surface 55 that is both at least generally planar and adapted to remain oriented at least generally perpendicular to a load-delivery surface LD of the tool holder TH during (and optionally throughout) movement of the first wall CW' toward the second wall CW. This is perhaps best appreciated with reference to FIGS. 14 and 15. Here, it can be appreciated that the contact surfaces 55 of the illustrated seating members 50 are (e.g., when the tool holder is in its open configuration, when the tool holder is in its closed configuration, and during movement of the tool holder between these two configurations) at least generally parallel (and preferably substantially parallel) to the clamping surfaces 95 of the tool holder TH. This, however is not strictly required.

In one group of embodiments, each seating member 50 has a contact surface 55 that is vertical, and the tool holder TH includes two seating members 50 mounted on the tool holder TH such that their vertical contact surfaces 55 are confronting surfaces adapted for respectively engaging opposed vertical side surfaces 85 of the tool's shank S (here, the surfaces 85 in some cases are parallel to each other). In this group of embodiments, the conjoint movement of the seating members 50 and the tool's shank S preferably is caused by the seating members' confronting vertical contact surfaces 50 delivering frictional force to the opposed vertical side surfaces 85 of the tool's shank. In certain embodiments of this nature, the frictional force is an upward vertical force. This force can optionally be the only upward vertical force applied by the tool holder (or at least by the seating members) to the tool when the walls CW, CW' close on the tool's shank S. In some cases, the only engagement of the seating members 50 and the tool's shank S involves vertical surfaces of the seating members engaging vertical surfaces of the tool's shank and delivering to the shank a frictional force that lifts the tool in an upward vertical direction until the load-bearing surfaces LD, LR of the tool holder TH and tool TL come into direct contact with one another.

As is perhaps best appreciated with reference to FIGS. 14 and 15, the seating members 50 preferably are adapted to bear against, and cam with, respective cam surfaces 25 of the tool holder TH (e.g., in response to the walls CW, CW' of the tool holder closing on the tool's shank and/or during the conjoint movement of the seating members and the tool's shank). In some embodiments, each cam surface 25 is defined by a slanted (e.g., with respect to the pressing axis PA, which optionally is a vertical axis) and/or curved wall section of the tool holder. For example, each of the illustrated cam surfaces 25 is defined by a slanted (e.g., with respect to the tool holder's clamping surfaces 95) wall section. The angle at which each cam surface 25 is offset from vertical can be varied as desired. In one useful example, this angle is about 13 degrees. In some cases, the confronting cam surfaces 25 diverge away from each other with increasing distance from a workpiece location WL (see FIG. 6).

In FIGS. 14-15 and 16-17, first and second seating members 50 are mounted respectively on the first CW' and second CW walls of the tool holder TH. Preferably, each seating member 50 has some freedom to move relative to the wall on which it is mounted. For example, the first seating member can be mounted on the first wall CW' so as to have a desired range of freedom to move (e.g., vertically and/or horizontally) relative to the first wall, and the second seating member can be mounted on the second wall CW so as to have a desired range of freedom to move (e.g., vertically and/or horizontally) relative to the second wall. In some embodiments of this nature, the first wall CW' is laterally moveable (at least in part) selectively toward or away from the second wall CW, and the second wall CW is adapted to be retained in a stationary lateral position (e.g., during the closing action of the tool holder TH and/or during the conjoint movement of the seating members 50 and the tool's shank S). The features described in this paragraph, however, are not strictly required.

Preferably, each seating member 50 is mounted on the tool holder TH so as to be moveable between first and second positions. In some preferred embodiments of this nature, the tool-mount channel C opens toward a workpiece location WL, and each seating member 50 when in the first position is closer to the workpiece location than when in the second position. Preferably, movement between the first and second positions involves the seating member 50 undergoing a change in vertical position (i.e., elevation), e.g., relative to a portion of the tool holder that is stationary during the tool holder's closing action and/or during the conjoint movement of the seating members and the tool's shank.

FIG. 14 depicts the first position for two exemplary seating members 50. The illustrated seating members 50 occupy their first position prior to being moved into forcible engagement with the tool's shank. The first position here occurs when each seating member is at the lowest elevation in its range of motion. FIG. 15 depicts the second position for two such seating members 50. Here, each seating member ends up being in its second position once the tool holder has fully closed on the tool's shank. Thus, the second position here occurs when each seating member is at a higher elevation than when in the first position (optionally the second position is the highest elevation the seating member occupies during, or at the conclusion of, the tool holder's closing action upon the shank of a tool). These features, however, are by no means required. In some embodiments, once the tool holder has fully closed on a tool's shank, the seating members no longer hold the tool in position, but rather all the clamping force on the tool at such time can optionally be provided by the tool holder's clamping surfaces 95.

Figure 6:
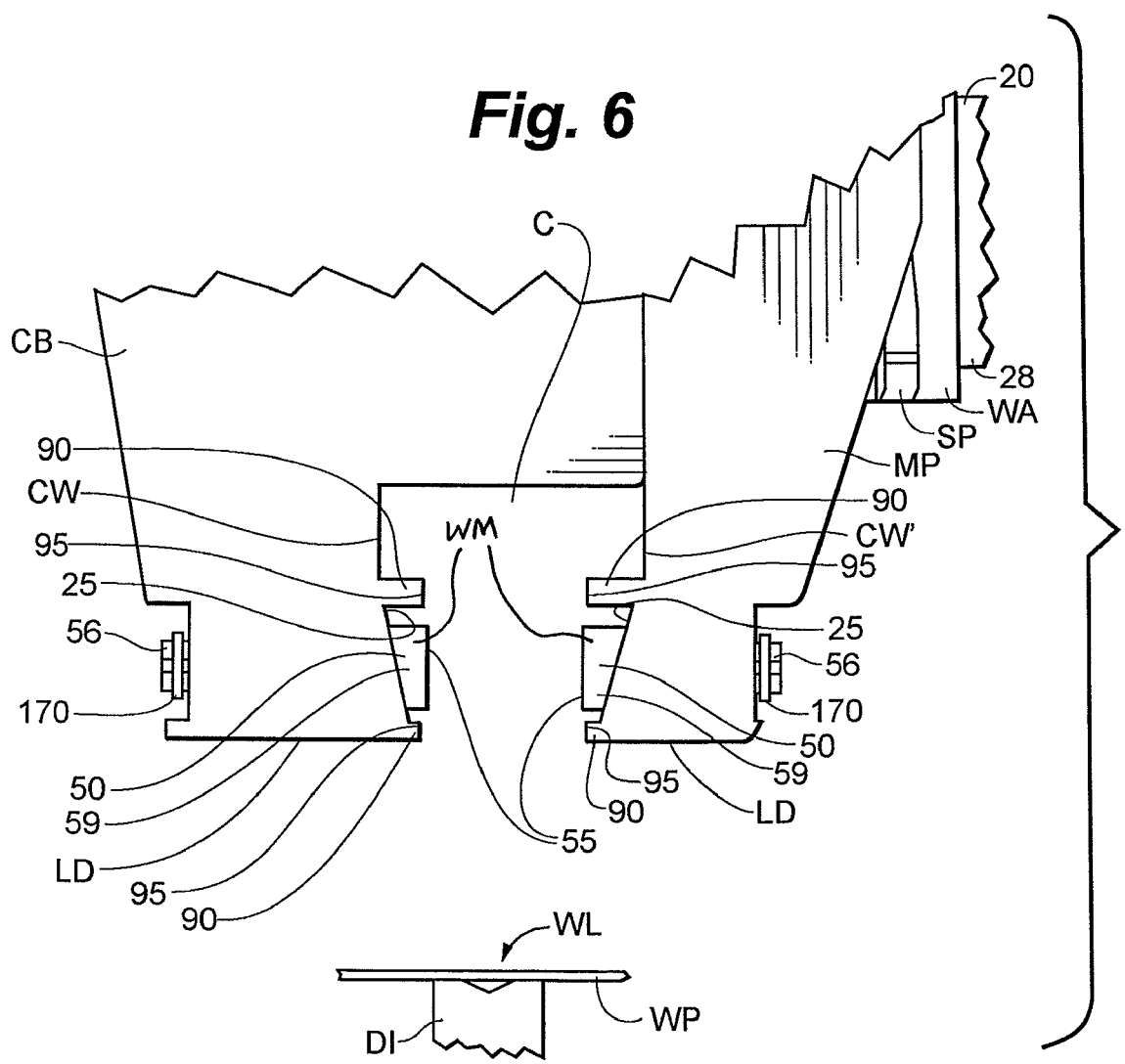
FIG. 6 is a partially broken-away side view of a tool holder in accordance with certain embodiments of the invention.

The seating members 50 can be mounted on the tool holder TH in different ways. In some cases, the first seating member 50 is mounted on the tool holder TH such that at least a portion of this seating member is moveable between first and second positions by sliding along a slanted first cam surface 25 of the tool holder. Additionally or alternatively, the second seating member 50 can be mounted on the tool holder such that at least a portion of this seating member is moveable between first and second positions by sliding along a slanted second cam surface 25 of the tool holder. In some embodiments of this nature, the tool-mount channel C opens toward a workpiece location WL, and the first and second slanted cam surfaces 25 diverge away from each other with increasing distance from the workpiece location. This is best seen in FIG. 6.

Figure 7:
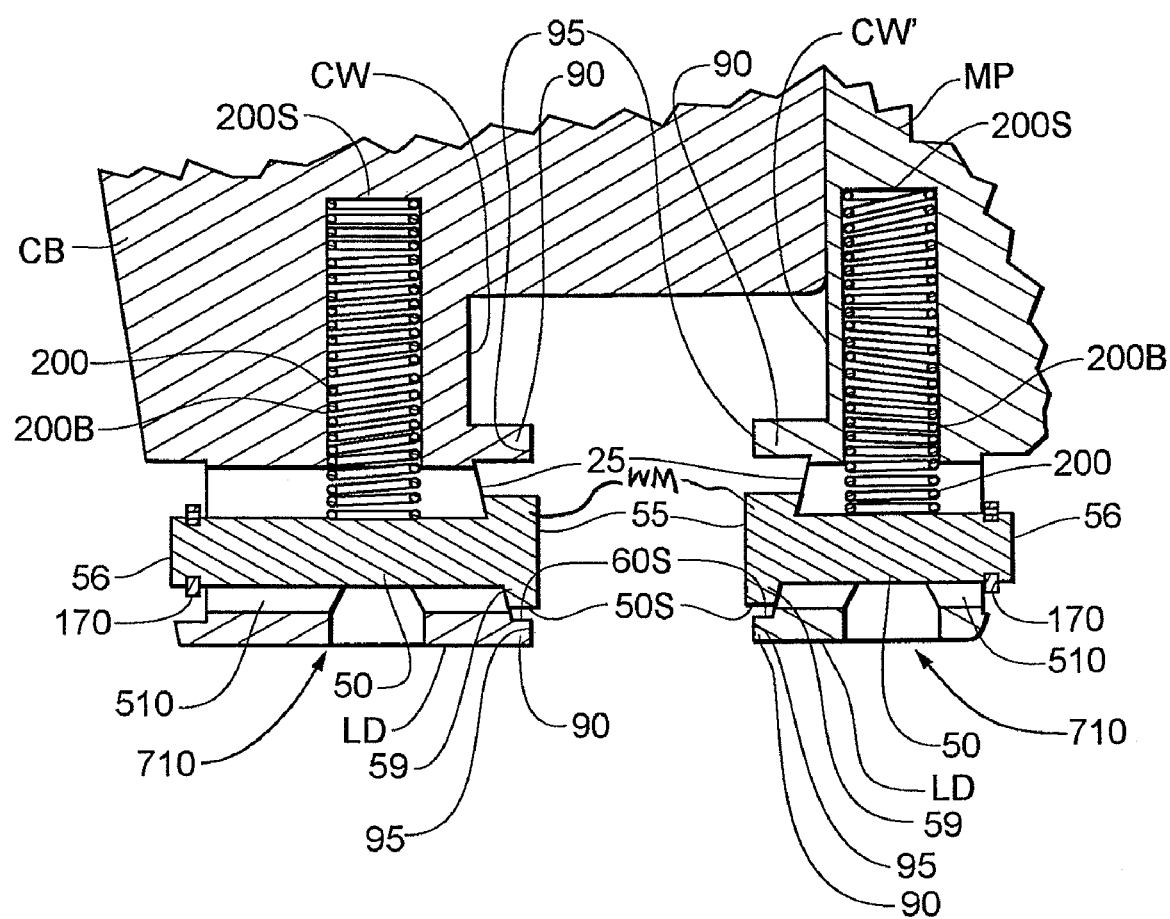
FIG. 7 is a partially broken-away cross-sectional side view of a tool holder in accordance with certain embodiments of the invention.
Figure 8:
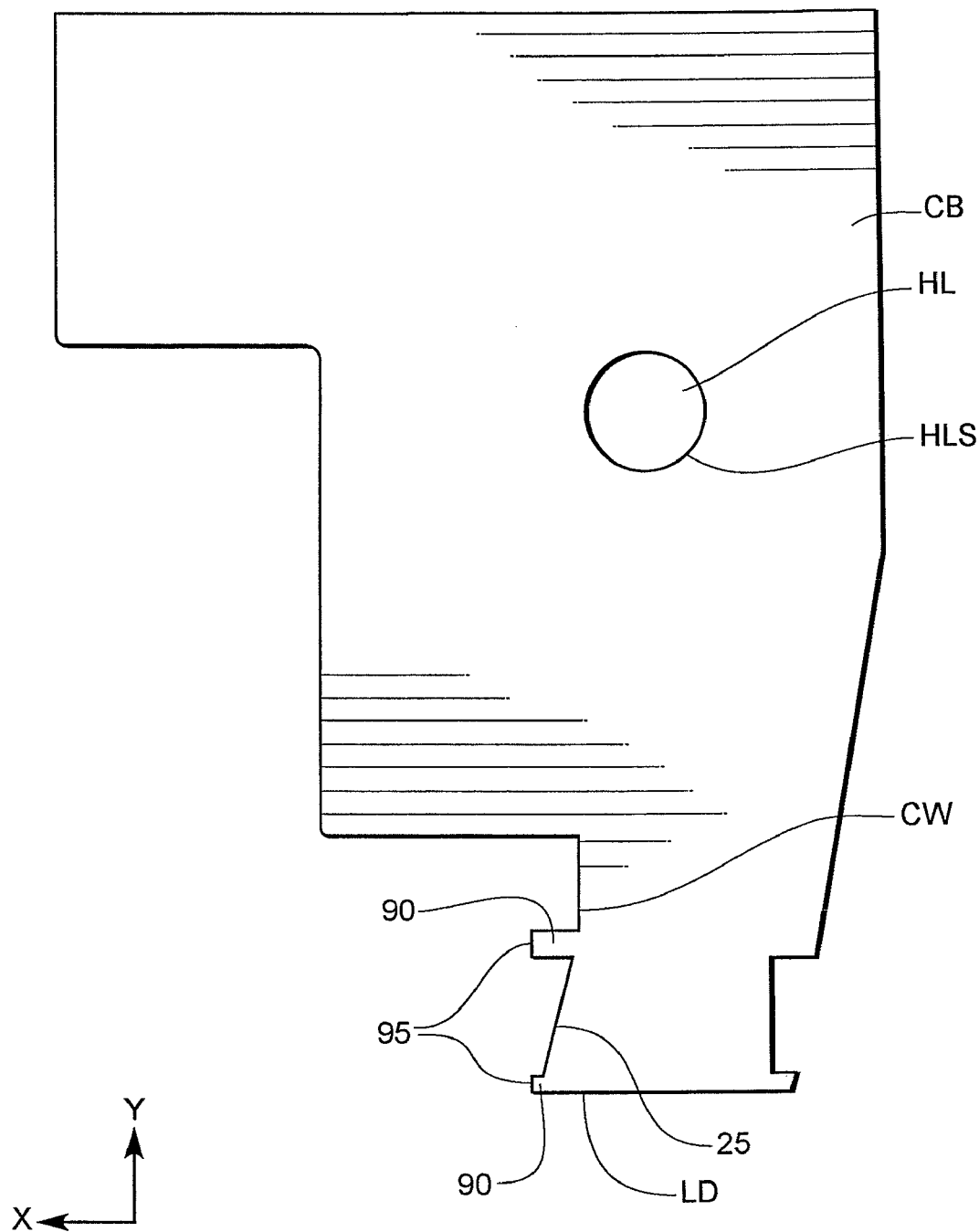
FIG. 8 is a side view of a tool holder block that is part of a tool holder in accordance with certain embodiments of the invention.

In embodiments where the seating members 50 are mounted on the tool holder TH so as to be moveable between first and second positions, each seating member can optionally be resiliently biased toward its first position. With reference to FIG. 7, it can be appreciated that a spring member 200 can be provided to resiliently bias each seating member 50 toward its first position. Here, each spring member 200 is mounted in a bore 200B defined by the tool holder TH such that each spring member is compressed between a seating member 50 and a surface 200S of the tool holder. In embodiments like that of FIG. 22, each spring member can be mounted in a bore 200B' defined by a seating member 50. Here, each spring member (not shown) is compressed between a seating member 50 and a surface 200S of the tool holder. Thus, one end of each spring member 200 seats against a surface 200S of the tool holder TH, while the other end seats against a seating member 50. As a result, each seating member 50 is resiliently biased toward its first position. In embodiments like that of FIG. 24A, each spring member 200 is a retaining spring that holds a seating member 50 in place and resiliently biases it toward its first position.

In FIG. 7, respective stop surfaces 50S and 60S of the seating member 50 and tool holder TH are shown as being separated for illustration purposes. It will be appreciated, though, that each spring member 200 would normally keep such surfaces together by holding each seating member 50 in the first position (i.e., until the tool holder is clamped on a tool so as to move each seating member to the second position, in the process overcoming the force of each spring 200).

Figure 11:
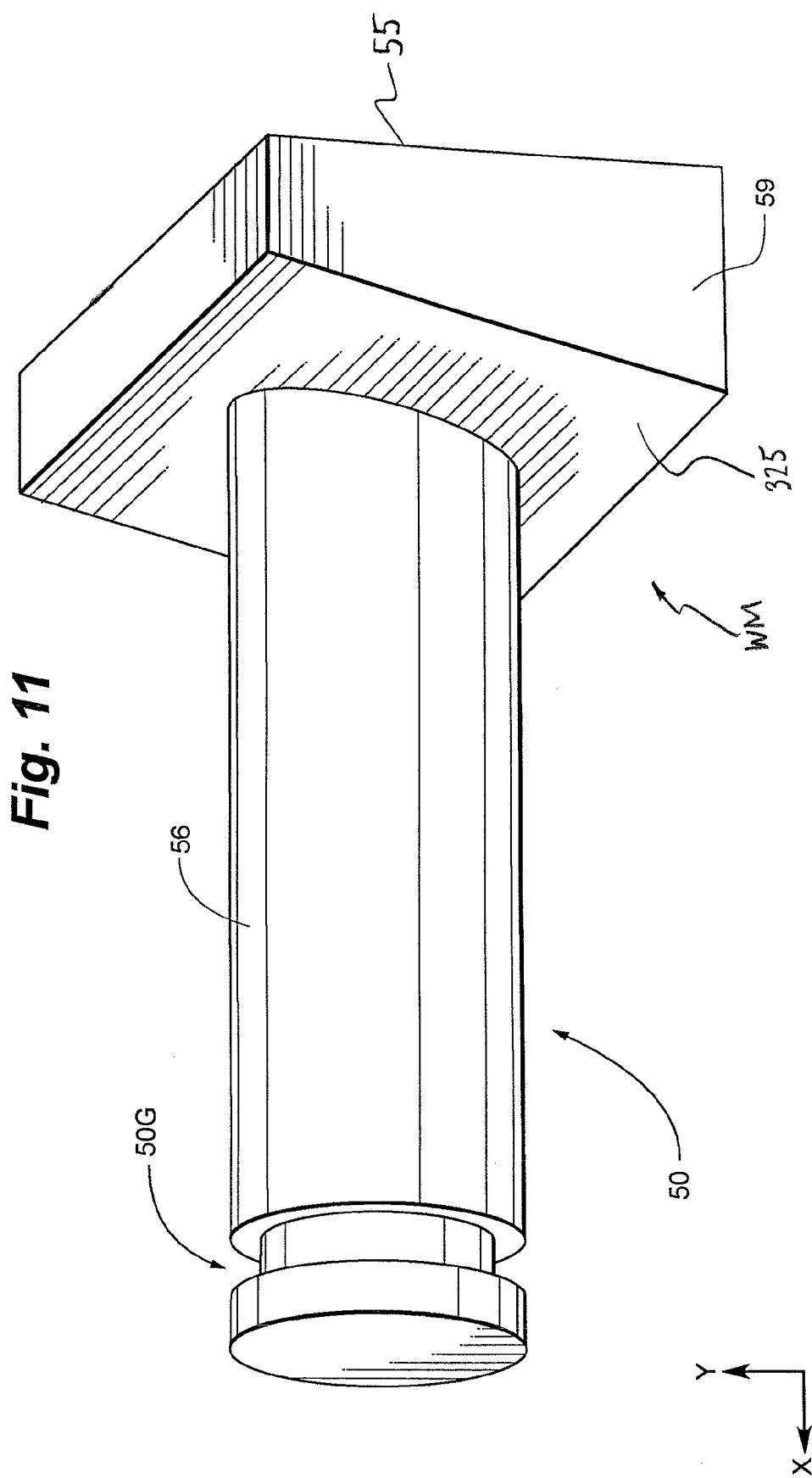
FIG. 11 is a perspective view of a seating member that is part of a tool holder in accordance with certain embodiments of the invention.
Figure 12:
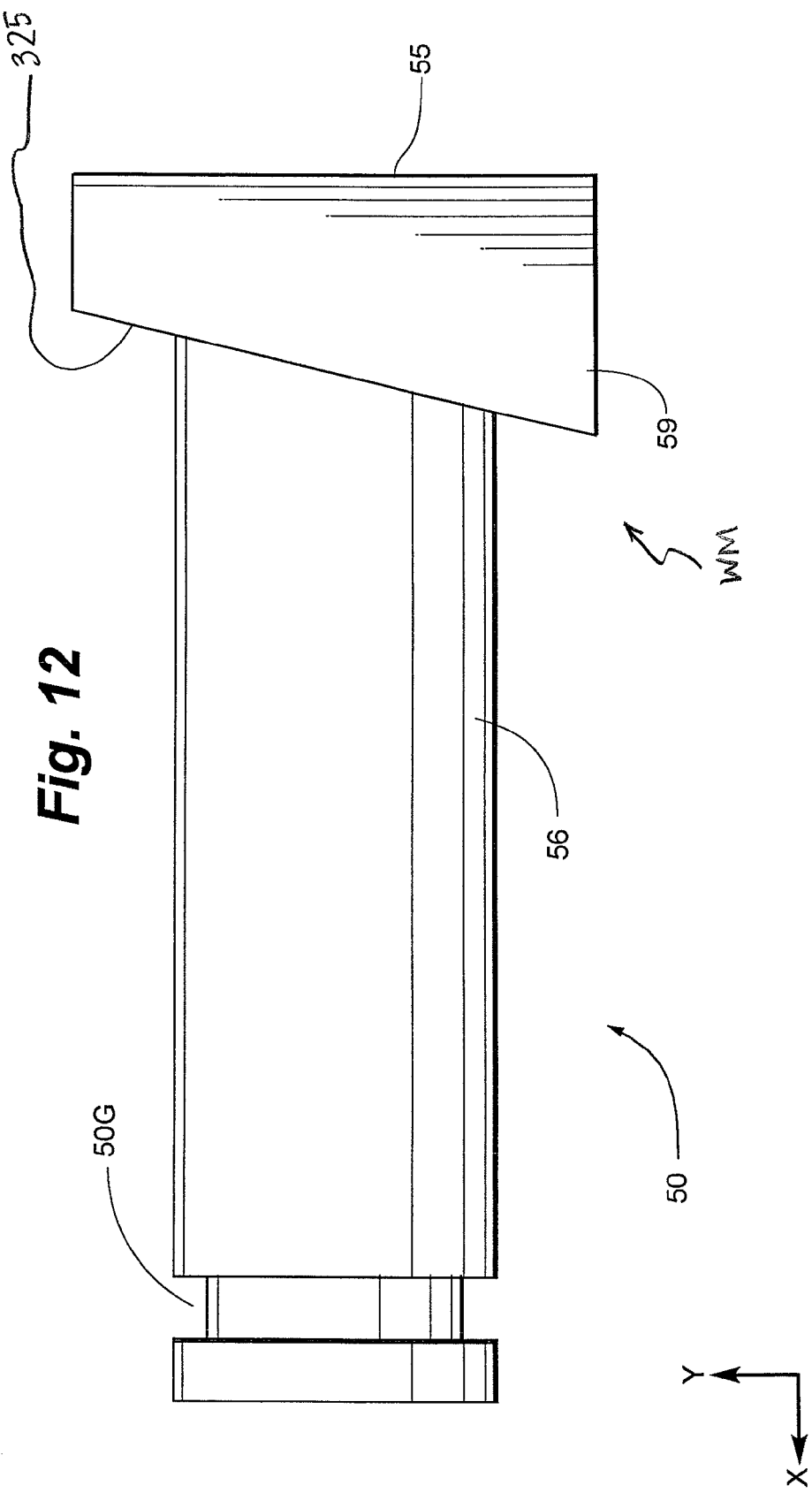
FIG. 12 is a side view of a seating member that is part of a tool holder in accordance with certain embodiments of the invention.
Figure 24A:
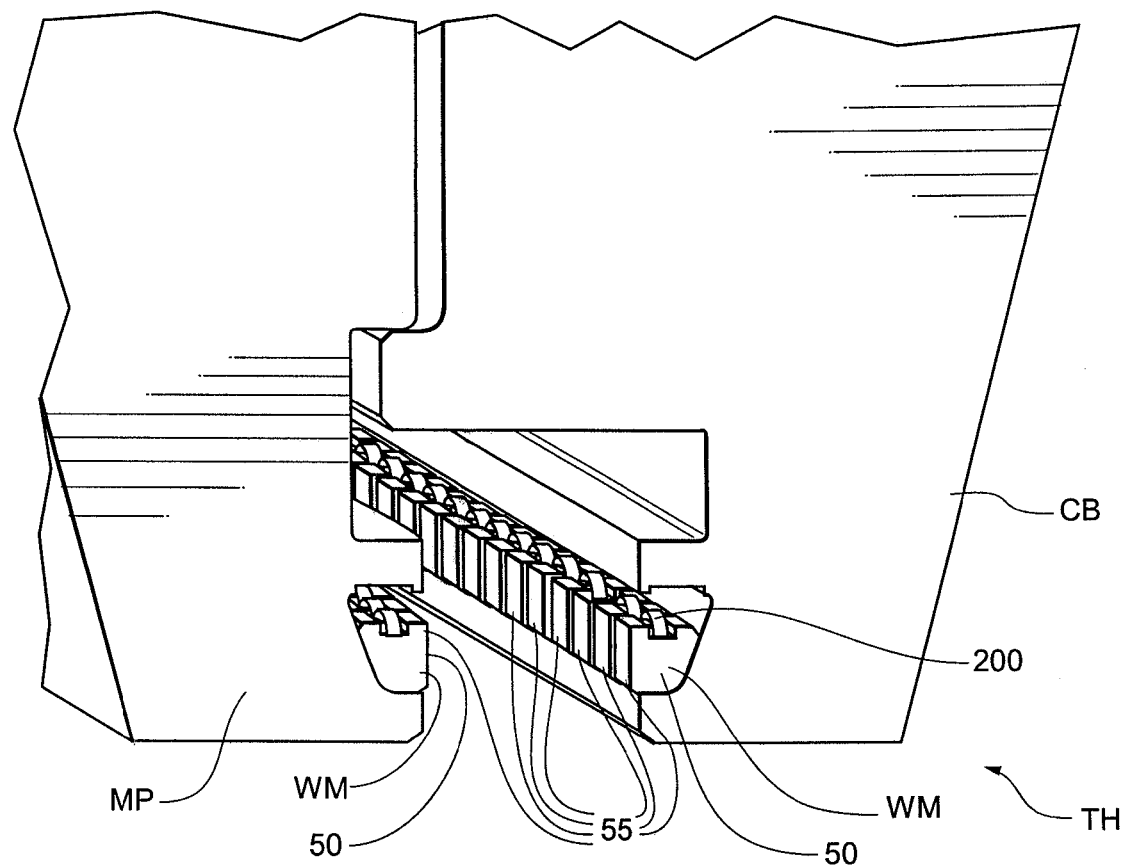
FIG. 24A is a partially broken-away side view of a tool holder in accordance with certain embodiments of the invention.
Figure 24B:
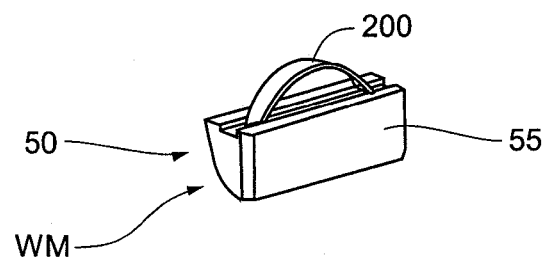
FIG. 24B is a perspective view of an exemplary wedge member that can be used for a tool holder in accordance with certain embodiments of the invention.
Figure 26:
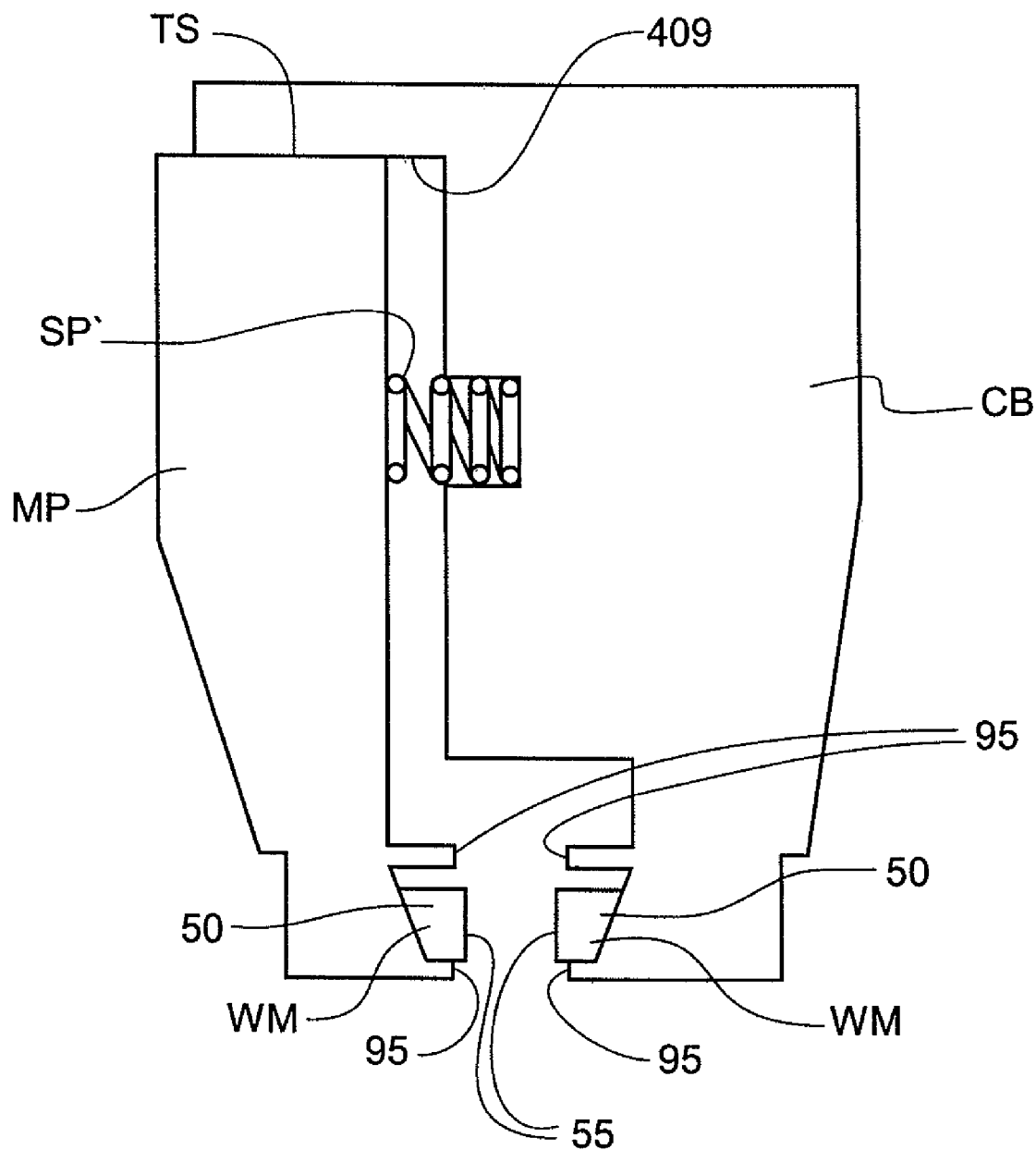
FIG. 26 is a schematic cross-sectional side view of a tool holder in accordance with certain embodiments of the invention.

In certain preferred embodiments, at least part of at least one of the seating members 50 has a cross-sectional configuration that is at least generally triangular. FIGS. 11 and 12 exemplify one useful seating member 50 of this nature. Here, the seating member 50 has a head portion 59 and a neck portion 56. The illustrated head portion 59 has a generally triangular cross-section (taken along a plane lying in both the "x" axis and the "y" axis). In other embodiments, there is provided a seating member 50 that does not have an elongated neck portion but does have a cross-sectional configuration that is at least generally triangular. Reference is made to FIGS. 24A and 24B.

One group of embodiments provides a seating member having a camming surface 325 that is oblique to (perhaps being offset by at least 5 degrees from) the contact surface 55 of the seating member. Here, during conjoint movement of the tool and the seating member, the contact surface 55 desirably is directly engaged with (and preferably does not move relative to) the tool, while the camming surface 325 of the seating member cams with a corresponding cam surface 25 of the tool holder. Many advantageous embodiments of this nature can be provided.

Figure 1:
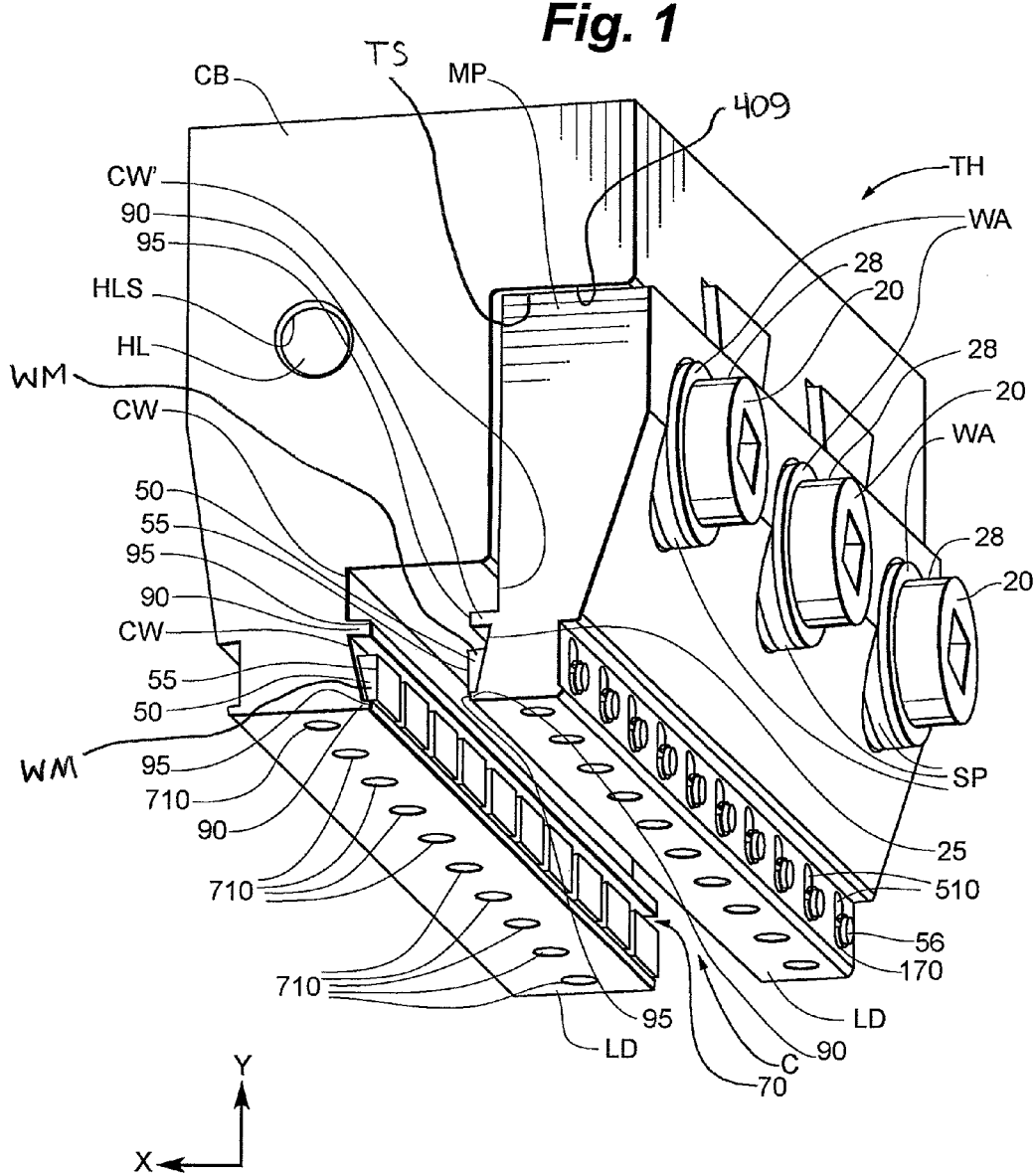
FIG. 1 is a perspective view of a tool holder in accordance with certain embodiments of the invention.
Figure 13:
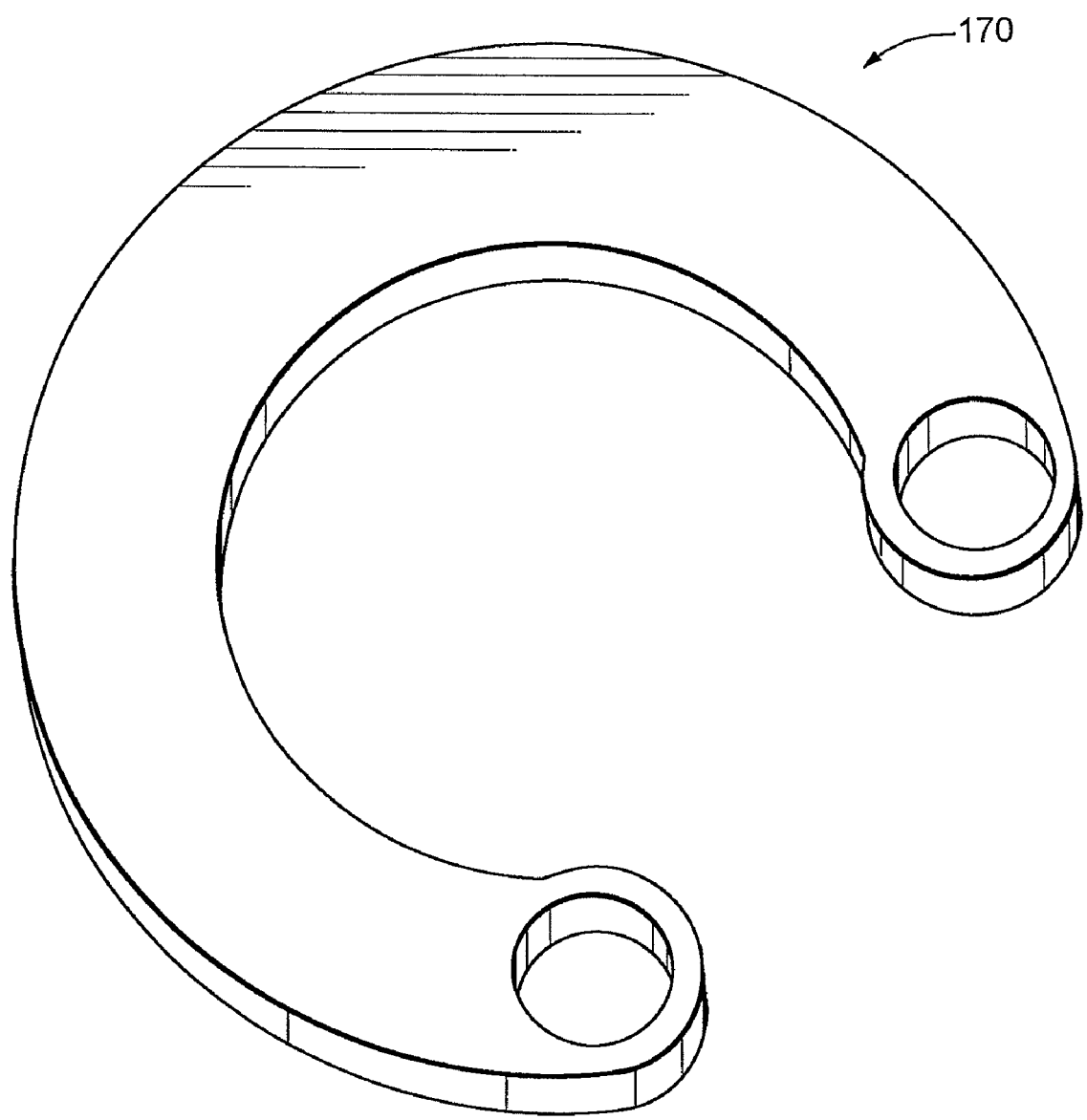
FIG. 13 is a perspective view of a clip member that is part of a tool holder in accordance with certain embodiments of the invention.

The seating member assembly shown, for example, in FIGS. 1 and 7, is representative of a group of embodiments wherein each seating member is mounted removably on the tool holder. Here, the neck 56 of the seating member 50 defines a groove 50G that is adapted for removably receiving a fastener 170. The optional fastener can be a clip (as exemplified in FIG. 13), pin, or another removable fastener. Thus, in certain embodiments, each seating member is mounted on the tool holder by virtue of a removable fastener, such that a damaged seating member can be easily removed and replaced. In some embodiments, a removable seating member comprising (optionally formed of) polymer is provided.

Figure 9:
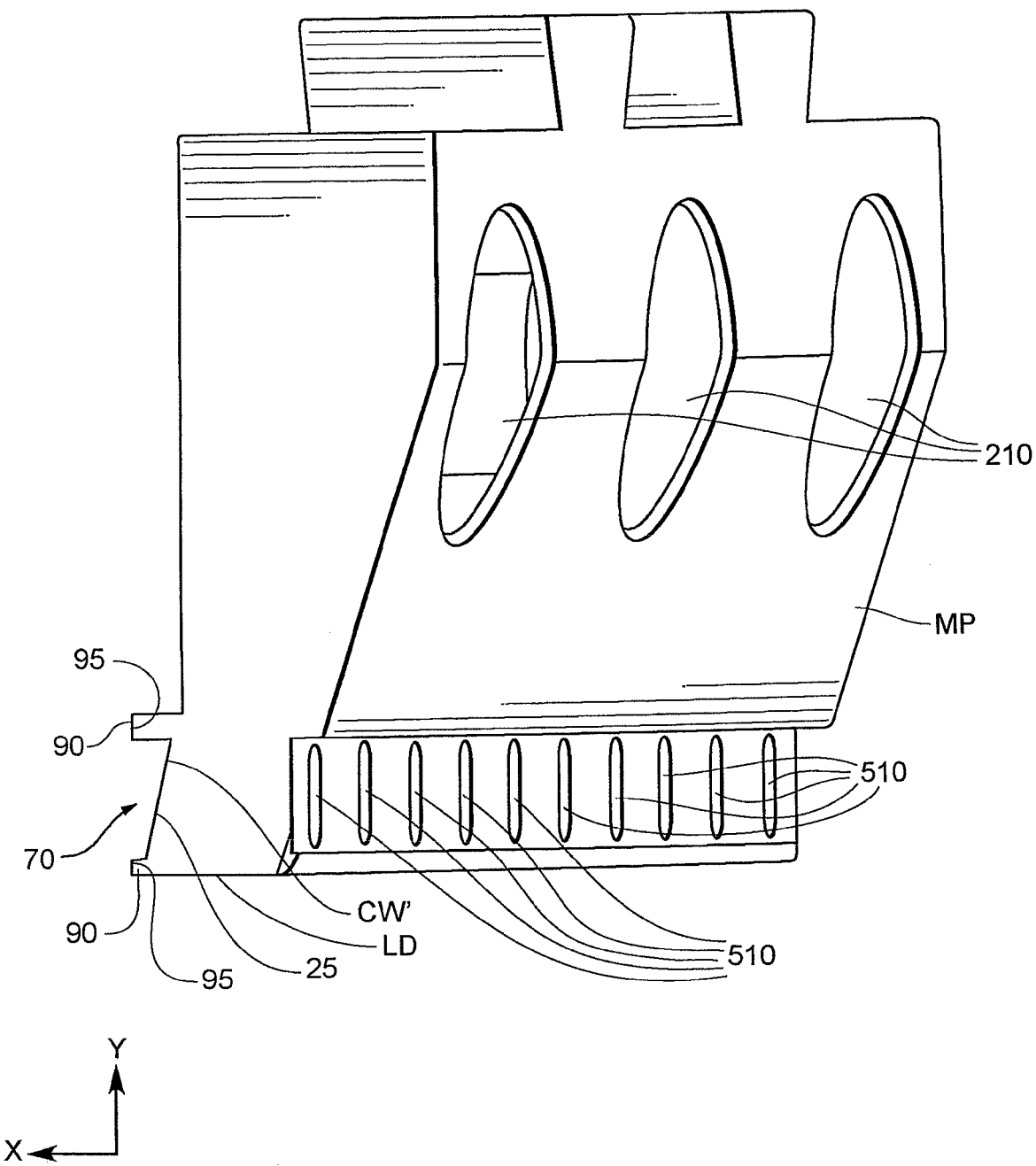
FIG. 9 is a perspective view of a moveable plate that is part of a tool holder in accordance with certain embodiments of the invention.

With reference to FIGS. 3, 6, 7, and 9, one exemplary seating member design comprises a wedge/clip assembly. Here, the seating member 50 is a wedge member of the type exemplified in FIGS. 11 and 12, and the fastener 170 is a clip of the type exemplified in FIG. 13. In FIGS. 7 and 9, it can be seen that the neck 56 of each wedge member extends through an opening 510 in one of the tool holder's confronting walls CW, CW'. Each illustrated opening 510 extends laterally through the entire thickness of the wall. The opening 510 is vertically elongated so that the neck 56 of the seating member has a range of freedom to move vertically within the opening 510. The head 59 of the wedge member is larger than the opening 510, such that the head 59 is not able to pass through the opening 510. The neck 56 of the wedge member has an end region that projects out from one end of the opening 510, and this end region has therein formed a groove 50G in which the clip 170 is removably retained. Thus, the neck 56 of the wedge member is retained in the opening 510 by virtue of the head 59 and clip 170 serving as stops that prevent the wedge member from escaping the opening 510. This type of wedge/clip assembly is merely one example of a suitable seating member design. Many useful variants will be apparent to skilled artisans given the present teaching as a guide. Moreover, a wedge member of this nature may be used advantageously without providing the clip member.

One manner of assembling a resiliently-biased wedge/clip assembly can be appreciated by referring to FIGS. 1 and 7. Here, each spring 200 is inserted into an opening 710 of each vertical bore 200B. The spring 200 is positioned against surface 200S and compressed such that the spring does not prevent the neck 56 of the wedge member from being inserted into one end of the lateral opening 510 and advanced laterally through the opening 510 so that the end region of the neck 56 projects out from the other end of the opening 510. Once the neck 56 of the wedge member is inserted into, and advanced through, the opening 510, the clip 170 is fastened in the wedge members grove 50G so that the wedge member is prevented from coming off the wall on which it is mounted. It is to be appreciated that the features described in this paragraph merely reflect one exemplary manner of assembling a resiliently-biased seating member on the tool holder. Many different alternatives can be used. For example, the configuration shown can also be used by simply omitting the clip 170.

In one group of embodiments, at least one of the seating members 50 comprises a wedge member at least a portion of which is carried alongside a cam surface 25 of the tool holder. Preferably, the cam surface 25 is adapted to bear against, and cam with, the wedge member (e.g., a camming surface 325 thereof) so as to cause relative movement of the wedge member and the cam surface. In some embodiments of this nature, the wedge member is mounted on the tool holder so as to be moveable between first and second positions. The wedge member, for example, can be moveable between first and second positions by virtue of the wedge member (or at least a portion thereof) sliding along the cam surface 25. This is perhaps best appreciated with reference to FIGS. 14 and 15.

The cam surface 25 can optionally be defined by a slanted and/or curved wall section of the tool holder. In FIGS. 14 and 15, the cam surface 25 is defined by a slanted wall section, although this is not required. The slanted wall section extends between two projections 90 of this illustrated tool holder. Each of these projections 90 defines a clamping surface 95 (i.e., a surface that engages and forcibly retains the tool's shank when clamped in an operative position on the tool holder). Thus, the cam surface (which can optionally be a slanted and/or curved wall section) 25 together with the two projections 90 define a recess 70 in which at least part of the wedge member is disposed. These optional features, however, are not required.

In the embodiments of FIGS. 14 and 15, it is preferable that at least part of the wedge member project out of the recess 70 laterally beyond the projections 90 when the wedge member is in its first position. Further, when the illustrated wedge member is in its second position, it preferably does not project laterally beyond the projections 90. This is perhaps best appreciated by comparing FIG. 14 (in which each wedge member projects laterally beyond both of the two adjacent projections) and FIG. 15 (in which each wedge member does not project laterally beyond either of the two adjacent projections).

With continued reference to FIGS. 14 and 15, both of the illustrated seating members 50 comprise (e.g., are) wedge members that are adapted to bear against, and cam with, respective cam surfaces 25 of the tool holder TH. In more detail, when the first wall CW' is moved toward the second wall CW (i.e., at such time as the shank of a tool is received in the tool holder's channel), the wedge members forcibly sandwich the tool's shank S and in the process deliver frictional force to the shank. Preferably, this frictional force is oriented in a direction at least generally parallel to the pressing axis PA and causes the tool's shank S to move (together with the wedge members) relative to the cam surfaces 25 (and/or to the clamping surfaces as) until a load-receipt surface LR of the tool TL engages a load-delivery surface LD the tool holder TH.

Figure 19:
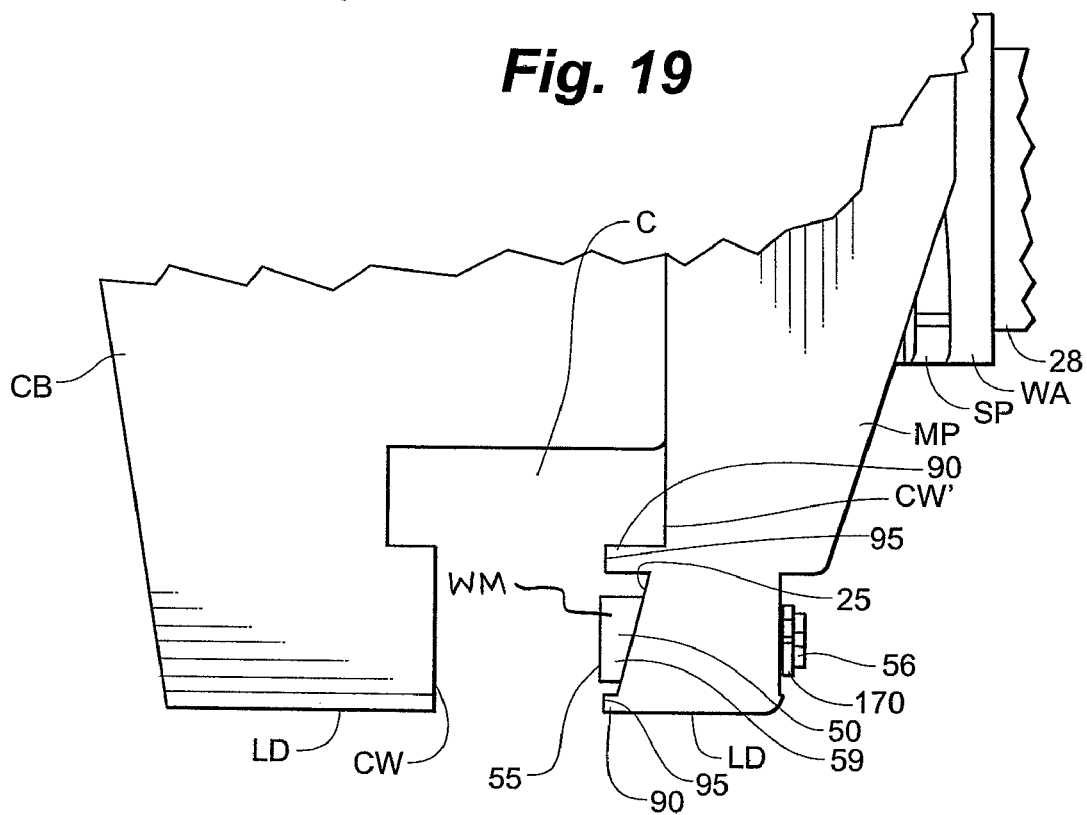
FIG. 19 is a partially broken-away side view of a tool holder in accordance with certain embodiments of the invention.

As is perhaps best seen in FIG. 1, a plurality (e.g., a series) of seating members 50 can optionally be mounted along a longitudinal length of the tool holder's first wall CW'. Here, a horizontal row of individual (e.g., discrete) seating members 50 are provided along the tool holder's first wall CW. Additionally or alternatively, a plurality of seating members 50 can optionally mounted (e.g., in a horizontal row) along a longitudinal length of the tool holder's second wall CW'. In other embodiments, the tool holder can simply have two seating members disposed on opposite sides of the tool-mount channel. Further, the invention provides some embodiments where seating members are not provided on both sides of the channel C. Reference is made to FIG. 19. Thus, the number of seating members, and their arrangement on the tool holder, can be varied to meet the requirements of different applications.

As noted above, the tool holder TH preferably has a closed configuration (exemplified in FIGS. 6, 7, 15, and 17-19) and an open configuration (exemplified in FIGS. 1, 4, 5, 16, 20, and 21). In such embodiments, the first CW' and second CW confronting walls preferably are closer together (at least in part) when the tool holder TH is in its closed configuration than when the tool holder is in its open configuration. In certain embodiments of this nature, the tool holder TH is resiliently biased toward its closed configuration. For example, one or more spring members SP can optionally be used to resiliently bias the tool holder TH toward its closed configuration. In some cases, springs or other resilient means are provided for biasing the tool holder toward its closed configuration and the tool holder has a selectively-operable actuator A adapted for being operated at a desired time to move the tool holder from its closed configuration to its open configuration. In certain embodiments of this nature, the actuator A is a hydraulic actuator, and the tool holder TH is resiliently biased toward its closed configuration by at least one spring member SP.

In other embodiments, the tool holder is resiliently biased toward its open configuration, such as by one or more spring members SP'. Exemplary embodiments of this nature (see FIGS. 26, 27 and 30-36) involve springs SP' or other resilient means for biasing the tool holder toward its open configuration and a selectively-operable actuator A adapted for being operated at a desired time to move the tool holder from its open configuration to its closed configuration. In embodiments like those exemplified in FIGS. 26, 27 and 30-36, the actuator A is hydraulic, and the tool holder is resiliently biased toward its open position by at least one spring member SP'.

When provided, the hydraulic actuator can advantageously comprise a hydraulic line HL at least a length of which is defined by a block CB of the tool holder. In some embodiments, this block CB also defines at least part of one of the confronting walls CW, CW' of the tool holder TH. Hydraulic fluid will generally (e.g., during use) be disposed within the hydraulic line HL, the block CB will commonly be a piece of metal (e.g., steel, such as 2312 prehard steel as is available commercially from Thyssen Krupp, Düsseldorf, Germany), and the hydraulic fluid can advantageously be in direct contact with an inner surface HLS of the hydraulic line length that is defined by the block CB (e.g., such that this inner surface HLS is defined by the metal of the block CB). These optional features can be provided, for example, in embodiments wherein a hydraulic actuator is built directly into (e.g., a block CB of) the tool holder TH.

Figure 2:
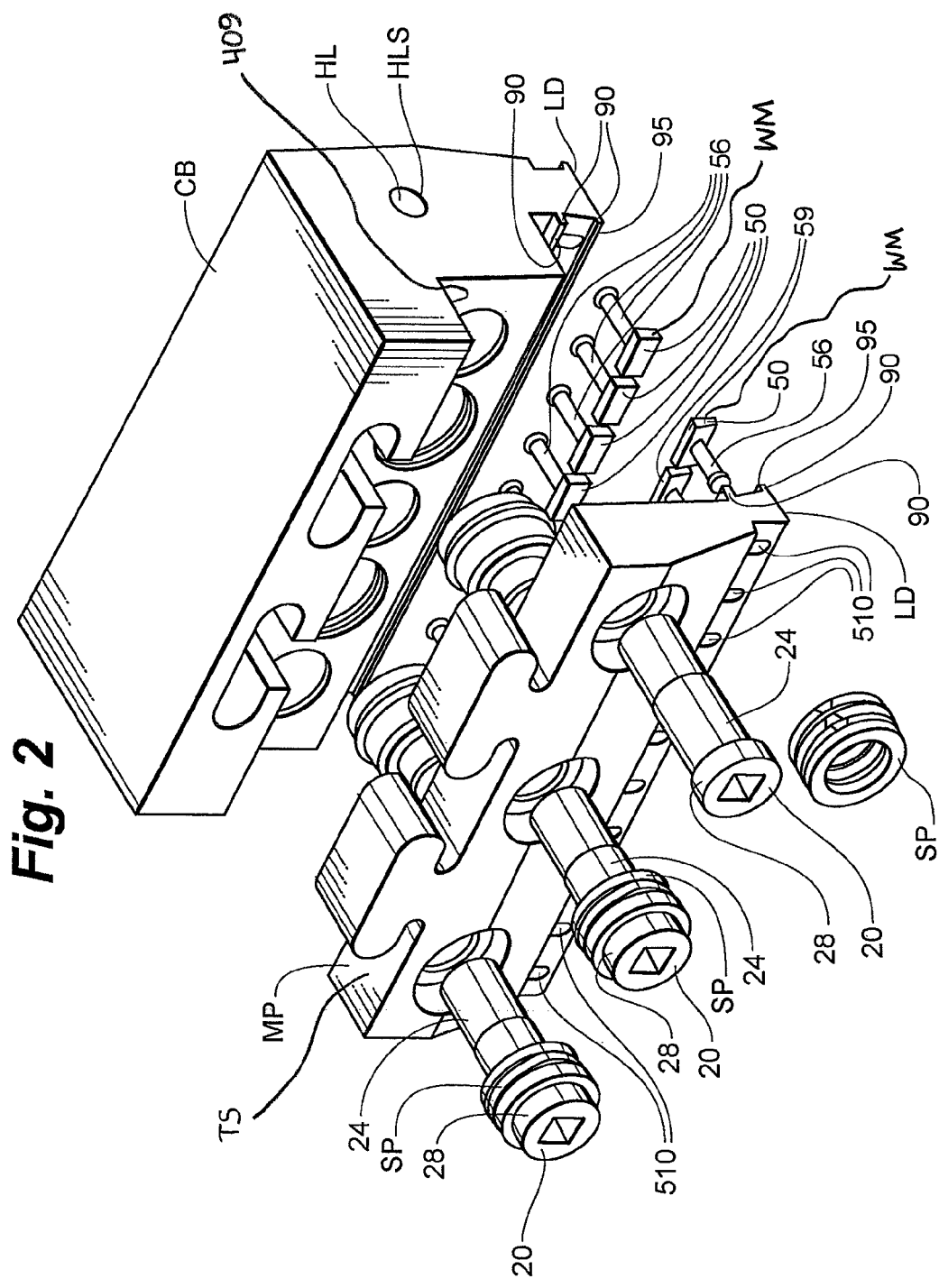
FIG. 2 is an exploded perspective view of a tool holder in accordance with certain embodiments of the invention.
Figure 3:
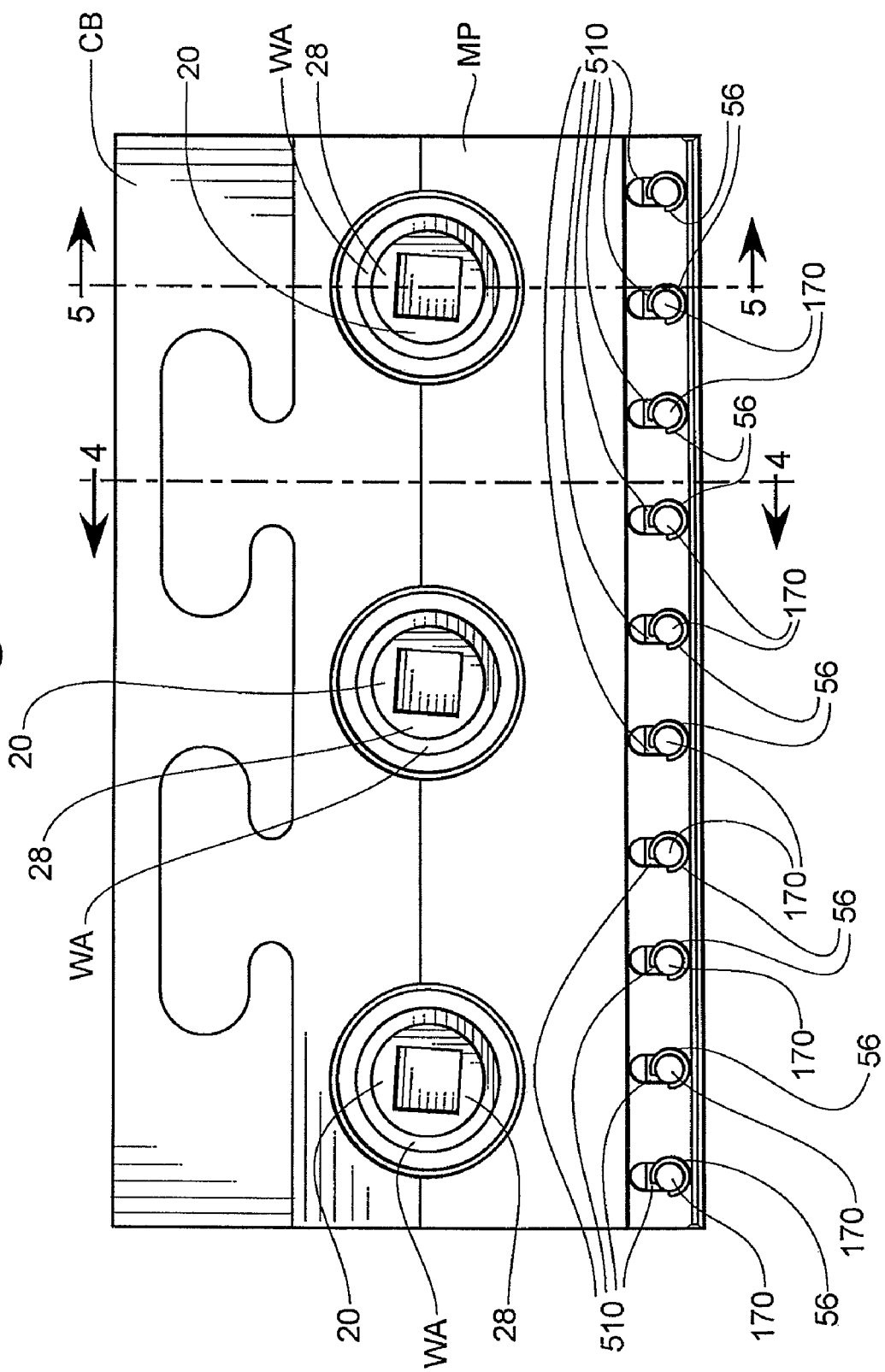
FIG. 3 is a front end view of a tool holder in accordance with certain embodiments of the invention.
Figure 4:
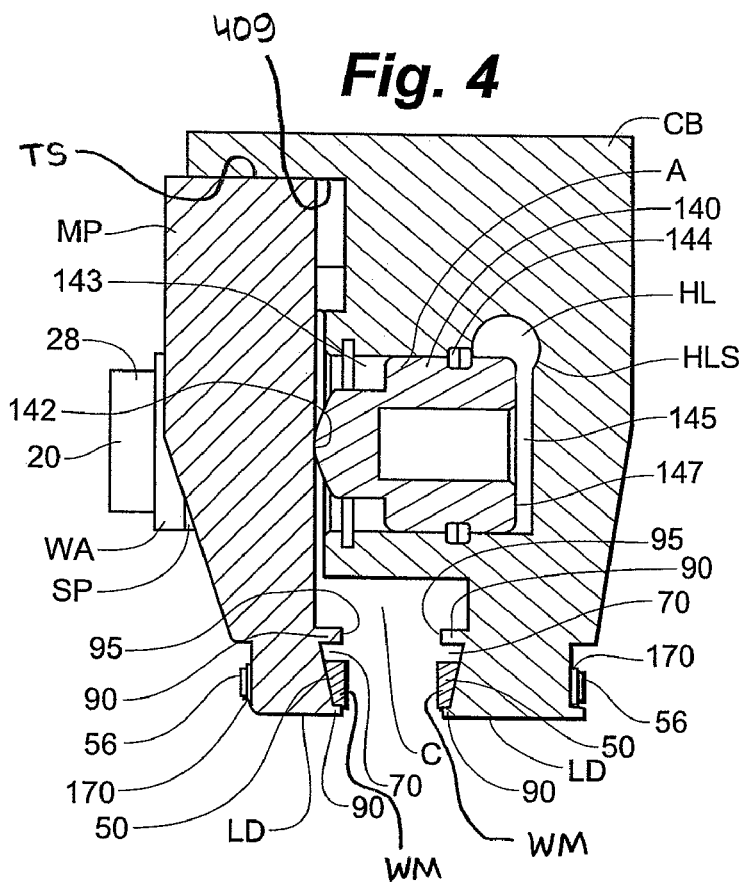
FIG. 4 is a cross-sectional side view of the tool holder of FIG. 3, the cross section being taken along lines F-F.
Figure 5:
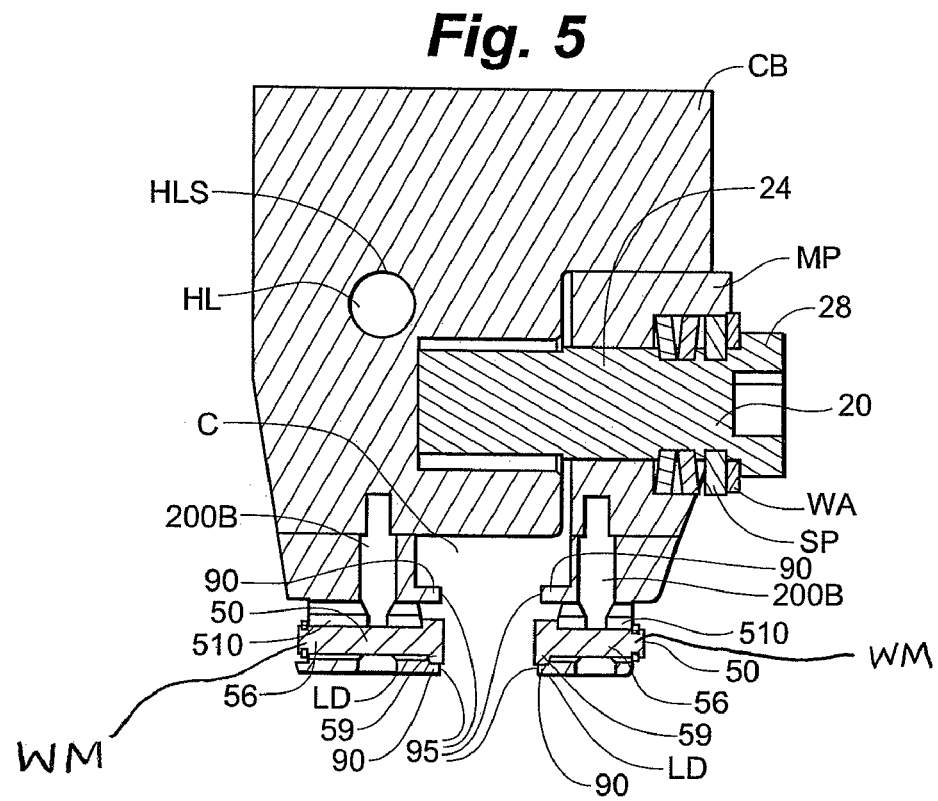
FIG. 5 is a cross-sectional side view of the tool holder of FIG. 3, the cross section being taken along lines E-E.
Figure 10:
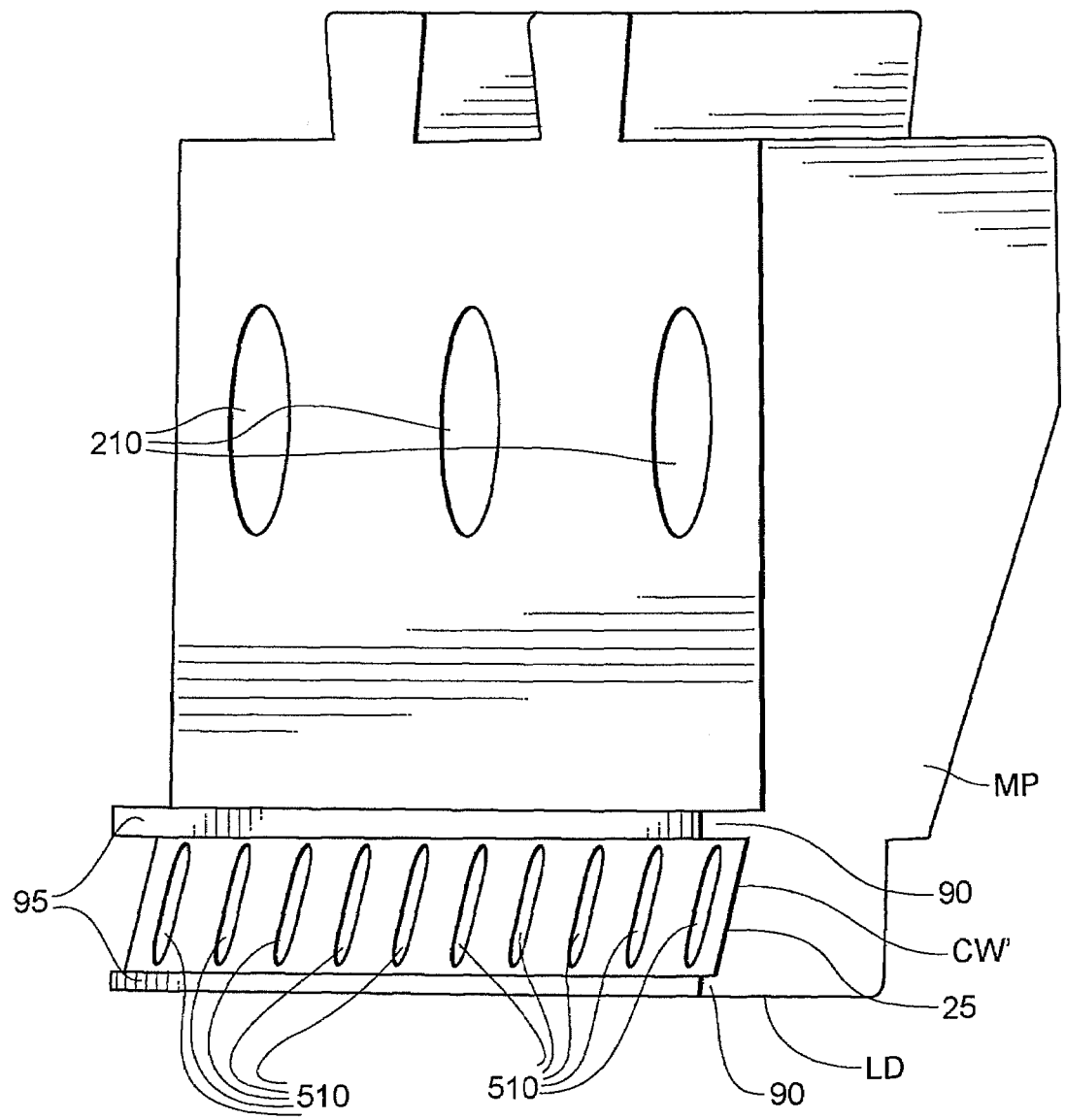
FIG. 10 is a perspective view of a moveable plate that is part of a tool holder in accordance with certain embodiments of the invention.

FIGS. 3-5 detail an embodiment wherein the tool holder is resiliently biased toward its closed configuration and a hydraulic actuator is provided for moving the tool holder to its open configuration. Here, a face plate MP (optionally formed of steel, such as the 2312 prehard steel available commercially from Thyssen Krupp) is mounted on the tool holder TH for lateral movement between open and closed positions. The moveable plate MP is mounted to a block CB of the tool holder TH by a plurality of bolts 20 each anchored at one end to the block CB. The illustrated block CB is adapted for being retained in a stationary lateral position during movement of the plate MP toward the block CB, although this is not required. Each bolt 20 has a neck 24 and a head 28. The neck 24 defines the anchored end of the bolt. The neck 24 extends away from the block CB and to the head 28 of the bolt. The moveable plate MP has a plurality of lateral openings 210 (further exemplified in FIGS. 9 and 10) through each of which the neck 24 of a bolt 20 projects. The plate MP is adapted to slide laterally on the necks 24 of the bolts 20 when the tool holder TH is moved between its open and closed configurations. The head 28 of each bolt 20 (optionally together with a washer WA) is sufficiently large (e.g., larger than opening 210) to prevent the plate MP from coming off the bolt. A spring member (optionally a spring washer) SP is positioned between the head 28 of each bolt 20 and the moveable plate MP. Such spring members SP resiliently bias the plate MP toward the block CB. As shown in FIGS. 1-3, the moveable plate MP can optionally be mounted on the tool holder TH by a plurality of bolt/spring assemblies of the described nature.

An advantageous fail-safe capability can be achieved by providing a hydraulic actuator (or another selectively-operable actuator) in combination with a clamp that is resiliently biased toward its closed position. This combination assures that the tool holder will move to, or stay in, its closed configuration in the event of any loss of power to the press brake. Thus, any tools mounted on the tool holder will remain securely clamped in the event of power loss. A variety of selectively-operable actuators can be used in such fail-safe embodiments. Likewise, a variety of spring means can be used to resiliently bias the tool holder toward its closed configuration.

FIG. 4 details one exemplary manner in which a hydraulic actuator can be used. Here, the hydraulic actuator A is built into the tool holder block CB. In more detail, the block CB itself defines an internal hydraulic line HL. To operate the actuator A, hydraulic fluid (e.g., pressurized oil) is delivered through the hydraulic line HL into an internal hydraulic reservoir 145, which preferably is also defined by the block CB. The hydraulic fluid delivered to the reservoir 145 applies pressure to a surface 147 of a cylinder or another moveable body 140, thereby forcing the body 140 to move from a retracted position to an extended position, in the process bearing against the moveable face plate MP and causing it to move from its closed position to its open position. In more detail, delivering hydraulic fluid into the reservoir 145 causes the body 140 to move (e.g., within an opening 143 defined by the block CB) in such a way that a leading surface 142 of the body 140 bears forcibly against the plate MP, hence causing the plate MP to move away from the block CB. O-rings 144 and/or backer seals or the like are preferably provided to create a substantially fluid-tight seal between the moveable body (e.g., cylinder) 140 and the block CB.

With reference to FIGS. 3-5, it can be appreciated that the illustrated face plate is operably coupled with a plurality of hydraulic actuators and a plurality of bolt/spring assemblies (described above). In FIGS. 3-5, the hydraulic actuators and bolt/spring assemblies are spaced alternately along a longitudinal length of the face plate. This arrangement, however, is strictly optional.

Figure 27:
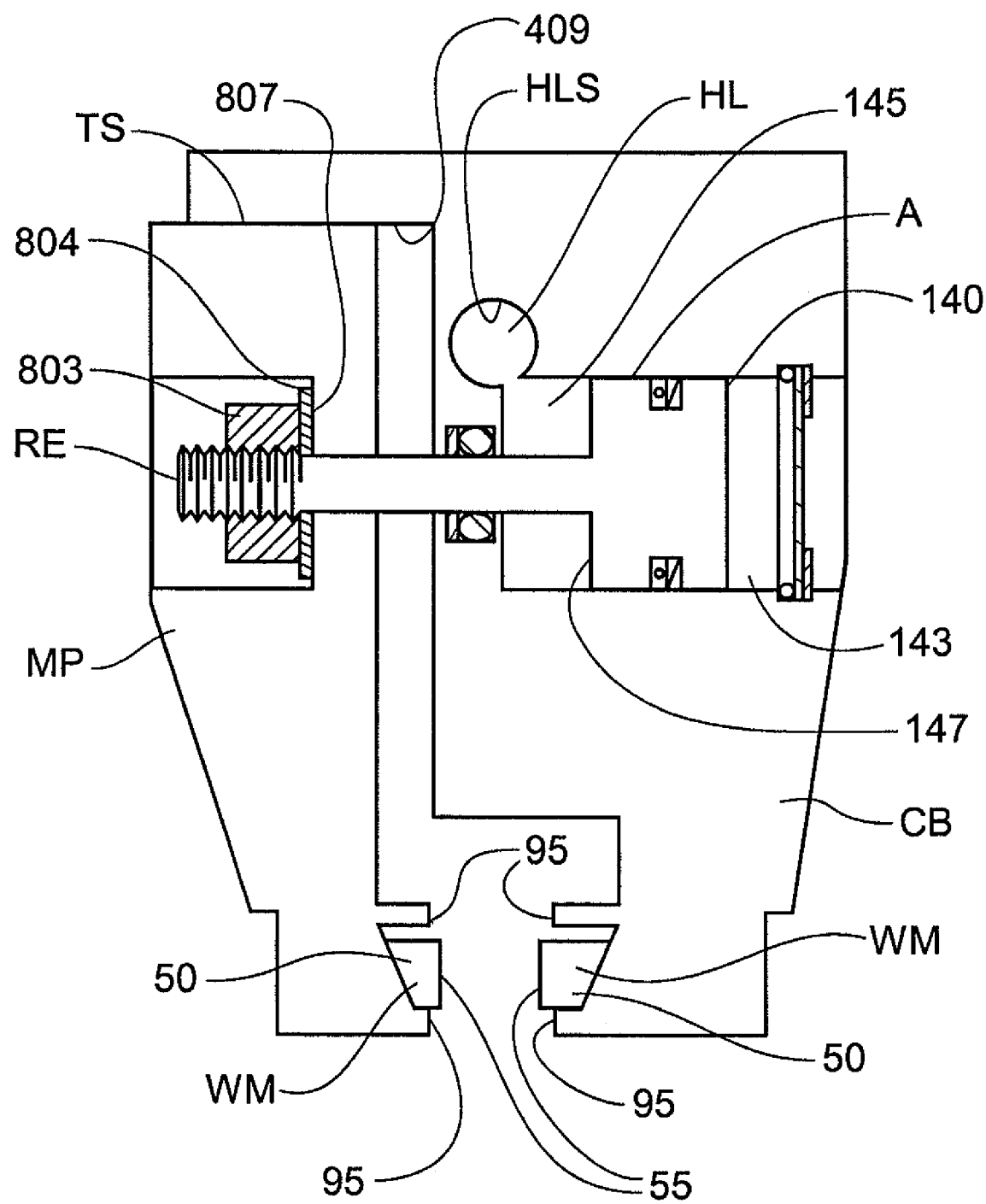
FIG. 27 is a schematic cross-sectional side view of a tool holder in accordance with certain embodiments of the invention.
Figure 28:
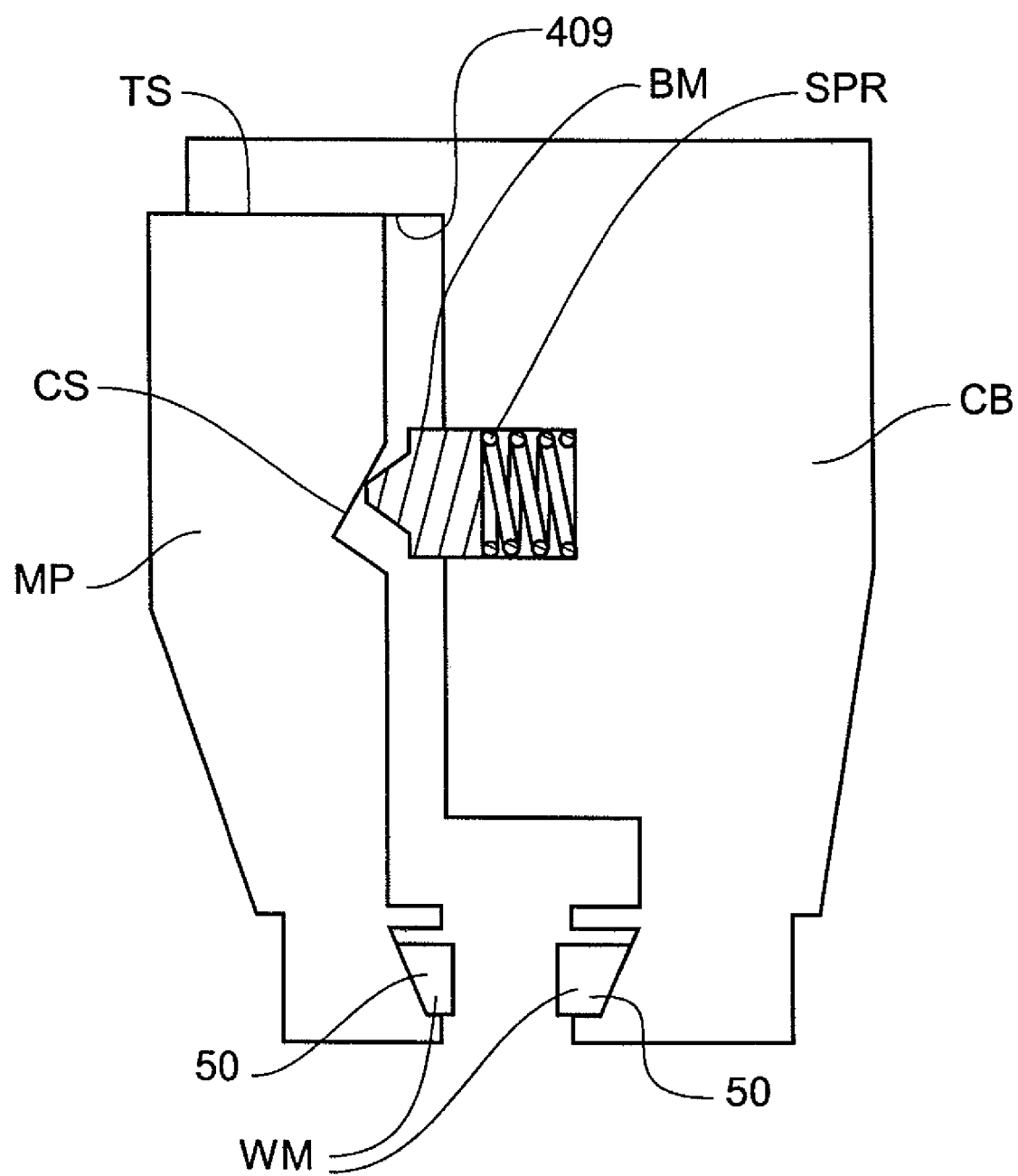
FIG. 28 is a schematic cross-sectional side view of a tool holder in accordance with certain embodiments of the invention.
Figure 29:
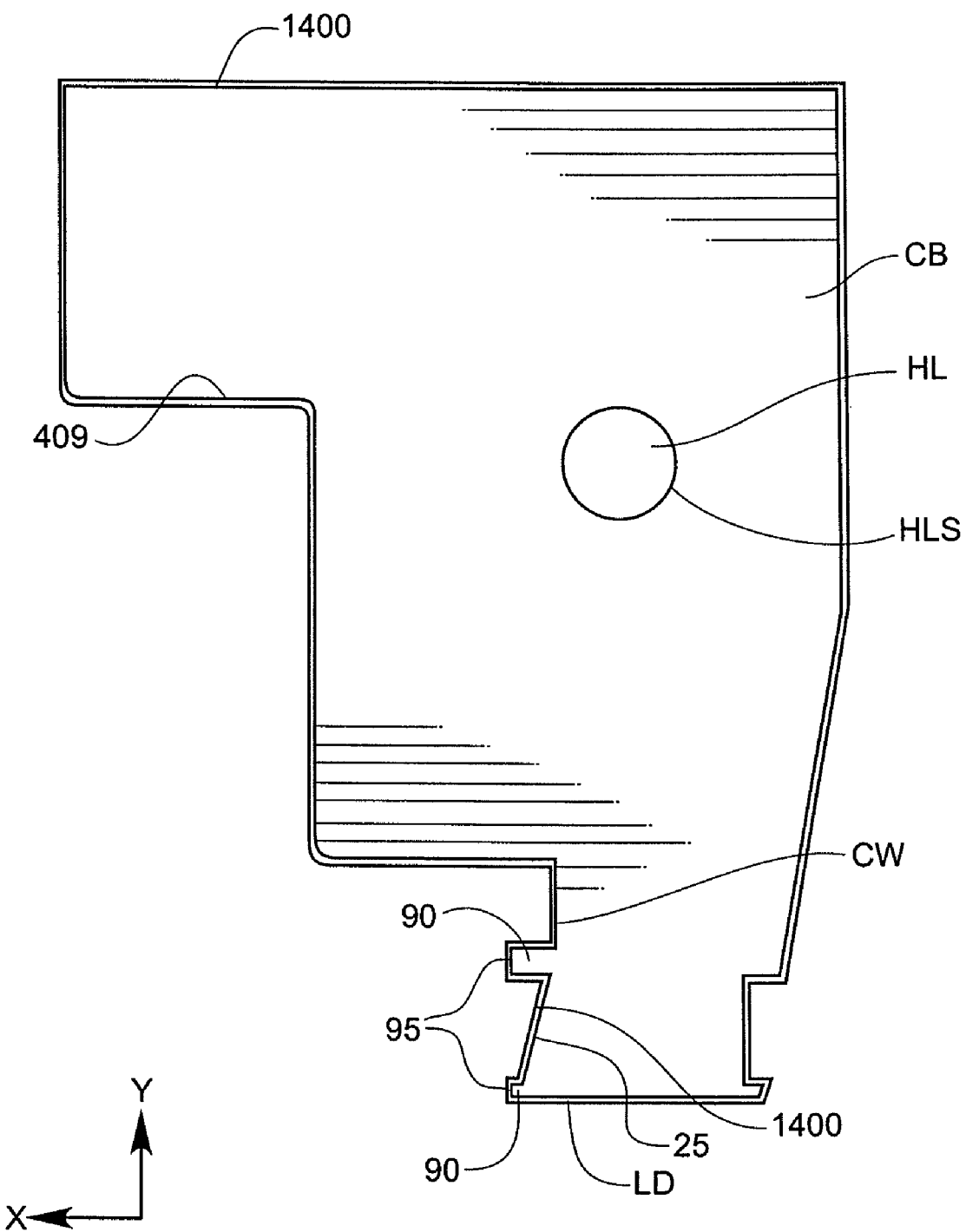
FIG. 29 is a schematic side view of a coated tool holder block in accordance with certain embodiments of the invention.
Figure 31:
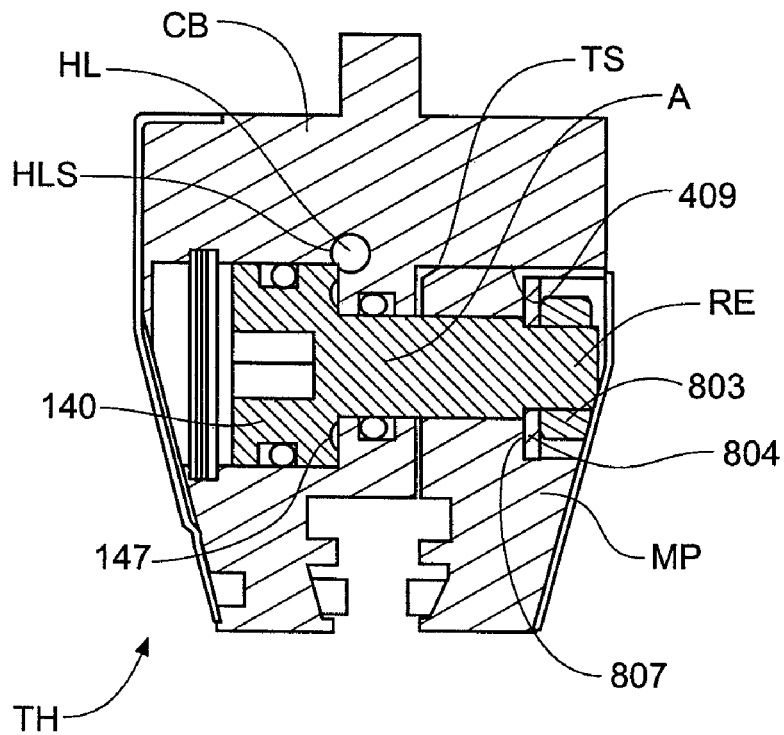
FIG. 31 is a cross-sectional view of the tool holder of FIG. 30 taken along lines A-A.
Figure 32:
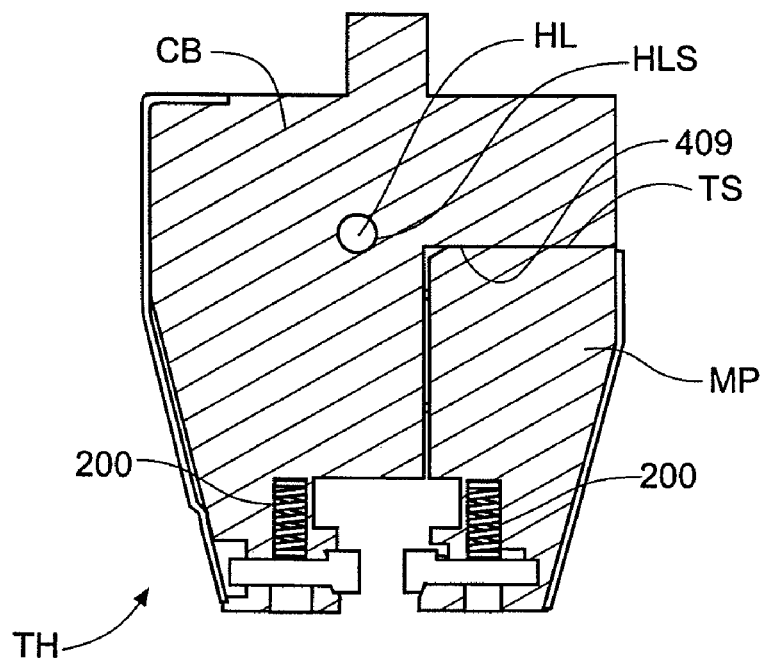
FIG. 32 is a cross-sectional view of the tool holder of FIG. 30 taken along lines B-B.
Figure 33:
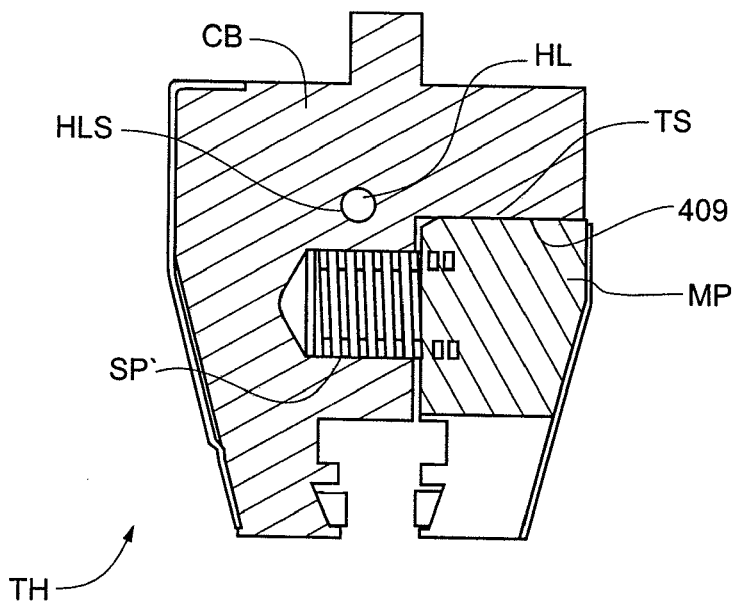
FIG. 33 is a cross-sectional view of the tool holder of FIG. 30 taken along lines C-C.
Figure 34:
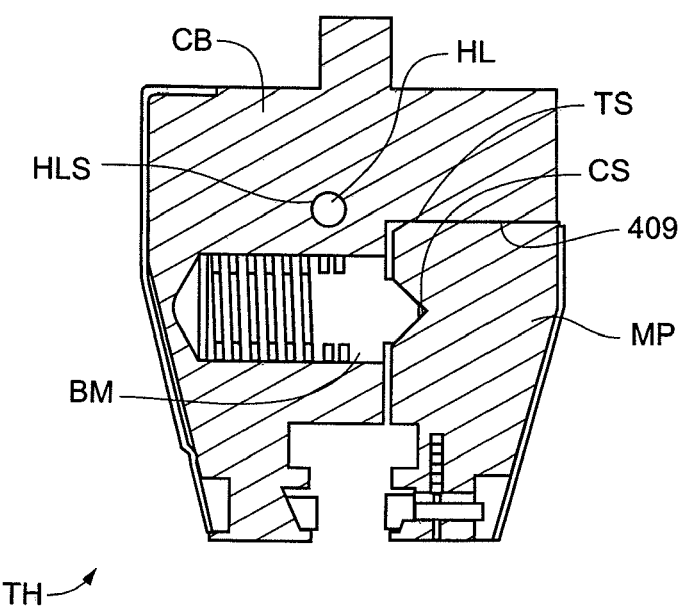
FIG. 34 is a cross-sectional view of the tool holder of FIG. 30 taken along lines D-D.
Figure 35:
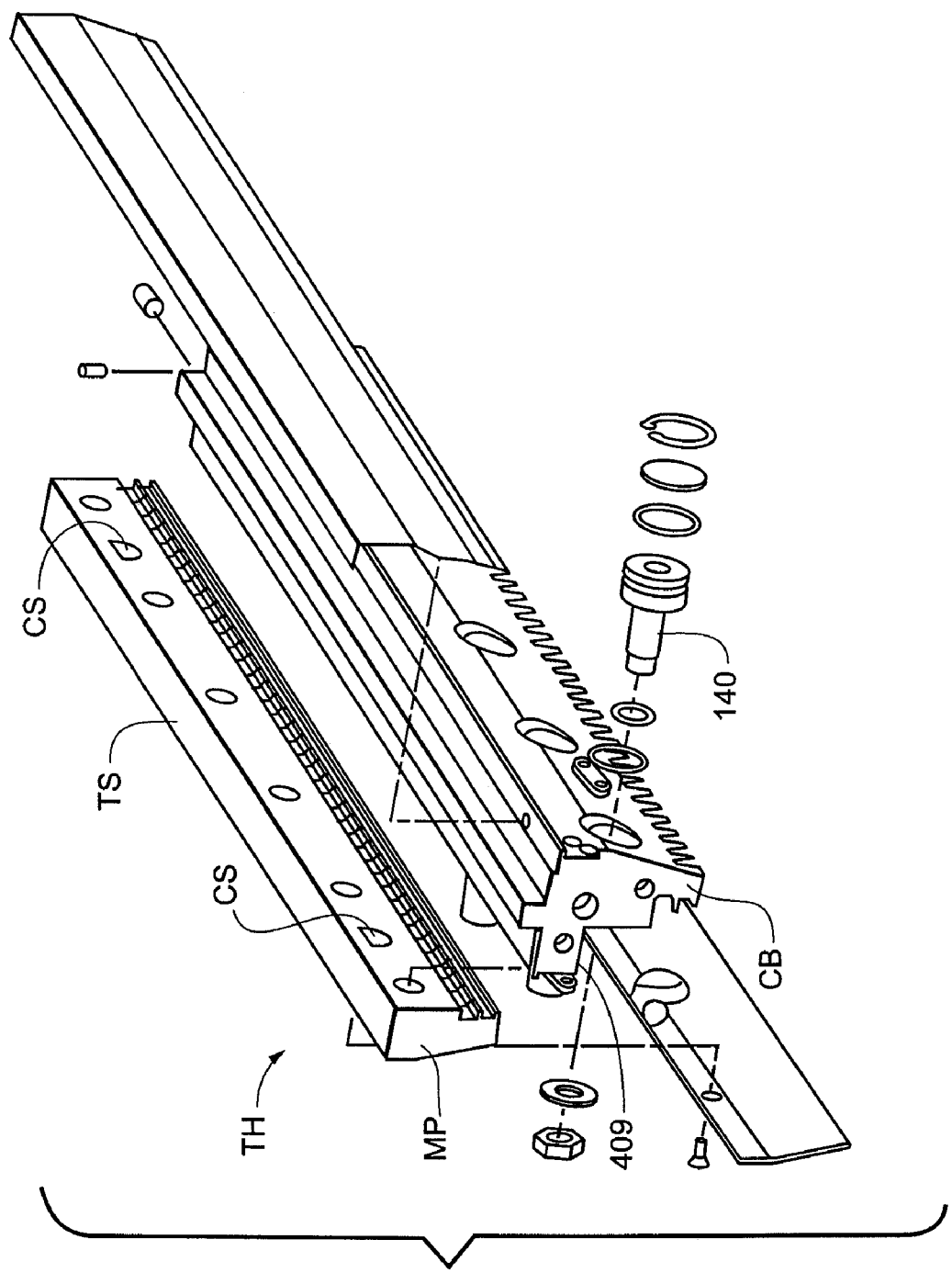
FIG. 35 is a perspective view of the tool holder of FIG. 30 as seen from one perspective.
Figure 36:
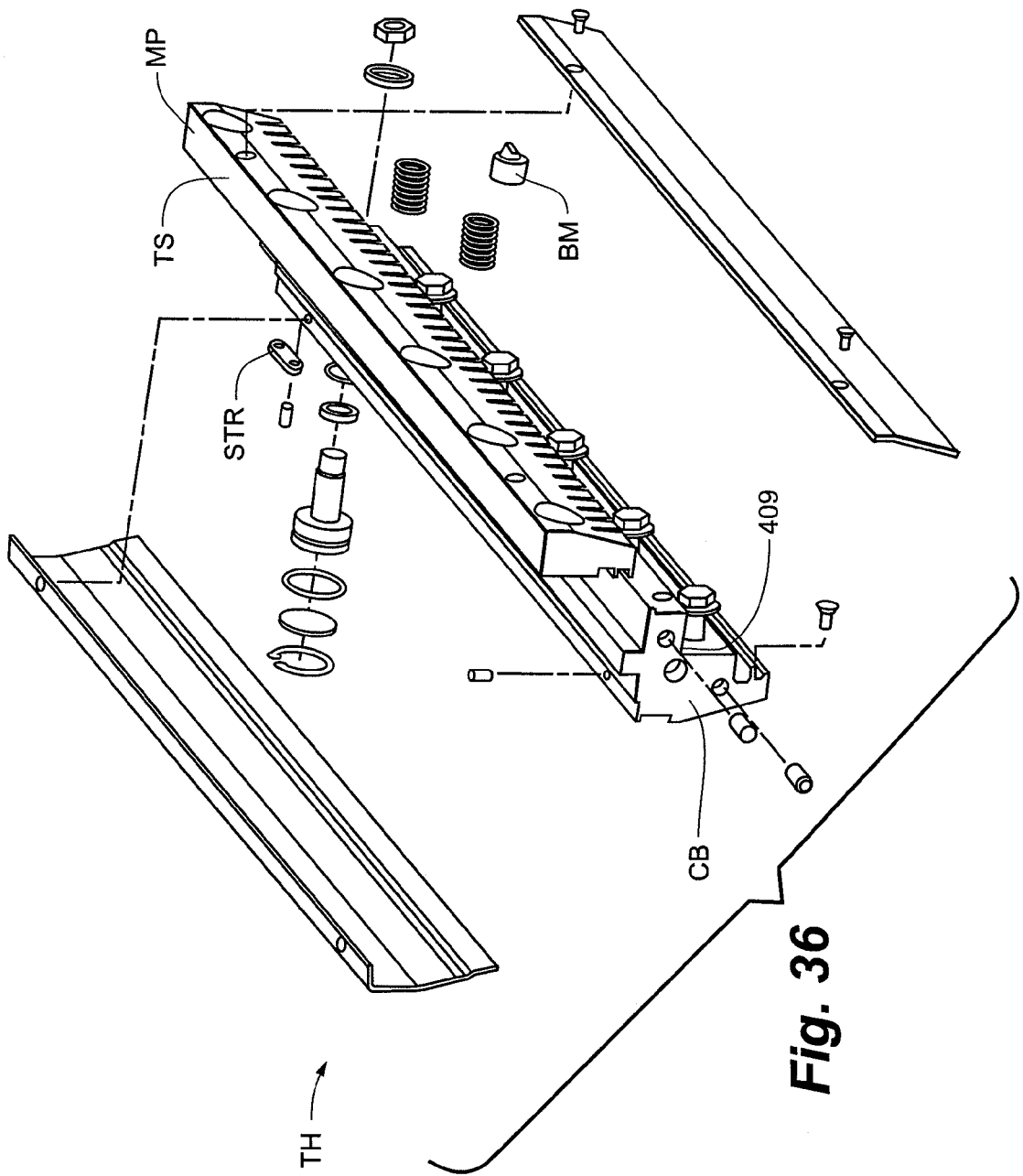
FIG. 36 is a perspective view of the tool holder of FIG. 30 as seen from another perspective.

In FIGS. 26, 27, and 30-36, another advantageous manner of employing a hydraulic actuator A is shown. Here again, the hydraulic actuator A is built into (i.e., is internal to) the tool holder block CB. Thus, the block CB itself defines an internal hydraulic line HL. The tool holder has a face plate MP that is maintained in its open position by at least one spring member SP'. The spring member SP', for example, can be seated in a pocket defined by the tool holder block CB (see FIGS. 26 and 33) such that the spring SP' (preferably together with a plurality of other springs SP' similarly arranged at locations spaced along a length of the tool holder) bears resiliently against the face plate MP so as to bias the plate MP toward its open position. When the actuator A is actuated, hydraulic fluid is delivered through the hydraulic line HL (see FIGS. 27 and 31) into an internal hydraulic reservoir 145, which preferably is also defined by the tool holder block CB. The hydraulic fluid delivered to the reservoir 145 applies pressure to a surface 147 of a cylinder or another moveable body 140, thereby forcing the body 140 to move in such a way (to the right as seen in FIG. 27, to the left as seen in FIG. 31) that the face plate MP is forced to move toward to tool holder block CB (such as by virtue of the rod end RE of the moveable body 140 having a nut 803 and washer 804 that bear forcibly against a surface 807 of the face plate). O-rings, backer seals, and/or other hydraulic sealing components can be provided as needed.

In embodiments involving a tool holder with a moveable plate MP or other clamp resiliently biased (e.g., by a plurality of springs SP') toward an open position in combination with a hydraulic actuator (or another selectively-operable actuator) adapted for being actuated so as to move the tool holder to its closed position (e.g., in the process overcoming the force of the springs SP'), an advantageous fail-safe capability can be provided by using a hydraulic system with a check valve. The check valve, when provided, is adapted to stop backflow of hydraulic fluid in the system. Thus, if the tool holder is in its closed position (and clamped forcibly on the shank of a tool) at such time as a loss of power occurs, the check valve will prevent hydraulic fluid backflow, which would otherwise allow the tool holder to move to its open position (due to the resilient bias of the springs SP'). As a result, the tool holder will stay in a closed position if power goes out at a time when one or more tools are operably clamped on the tool holder. Thus, the combination of a mechanical (e.g., spring based) constant-bias opening system and a selectively-operable hydraulic closing system with a check value (or other device adapted to prevent hydraulic fluid backflow) can be particularly advantageous.

In certain embodiments, the tool holder comprises a block CB, optionally comprising an integral piece of metal, having a longitudinal length of at least 1 foot, at least 1.5 feet, or even 2 feet or more. In embodiments of this nature, the tool holder can optionally includes a moveable plate MP, optionally comprising an integral piece of metal, that extends along a major portion (50% or more) of the block's length, or extends along substantially the entire length of the block, or extends along the entire length of the block.

In certain embodiments, the tool holder TH includes a plurality of sections connected in series by their longitudinal ends. FIG. 25 shows one longitudinal end of a tool holder section. Reference is also made to FIGS. 30A, 30B, 35, and 36. Two blind bores DW are provided on each end as dowel seats. Thus, when it is desired to connect a first section with a second section, two dowels DS (see FIGS. 30 and 30B) extending from the first section can be fitted respectively in two dowels seats on the second section, whereafter two dowels on another end of the second section can be fitted respectively in two dowel seats on an end of a third section, and so on. An optional through-port connector THC can be provided to connect the hydraulic lines HL of the serially connected sections of the tool holder. The connector, when provided, can also help assure proper alignment of the tool holder sections. In embodiments involving serially connected sections of a tool holder with hydraulic actuation, it may be advantageous to provide a strap STR or other connector that prevents the hydraulic pressure within the multiple-section tool holder from forcing the connected sections apart. A strap, clip, or the like (e.g., of metal) connected rigidly to the adjacent ends of two sections can be used.

In certain embodiments, it can be advantageous to provide a constant upward bias on the face plate MP. This, for example, can help assure proper alignment of seating members 50 on opposite sides of the tool-mount channel C. Exemplary embodiments are shown in FIGS. 28 and 34-36. Here, a spring-biased bearing member BM applies an upward force to the face plate MP by bearing forcibly against an angled surface CS of the face plate MP. In the illustrated design, this keeps a planar top surface TS of the plate MP snuggly against a planar, downwardly-facing surface 409 of the tool holder block CB, which thereby assures proper positioning and alignment of the seating members 50. In this design, the surfaces TS, 409 slide against each other during opening and closing of the tool holder. These details, however, are strictly optional.

One particular embodiment of the nature depicted in FIGS. 26-28 and 30-36 will now be described. The tool holder includes a plurality of sections connected in series as described above. The operating hydraulic pressure is about 3,000-4,000 psi. Each section of the tool holder is about two feet long. Six hydraulic pistons (as moveable bodies 140) are spaced along the length of each section every 4½ inches or so. Two spring biased bearing members BM (see FIGS. 28, 34, and 36) are provided on each section. The bearing members are formed of steel, and they are each biased by a heavy die spring (450 pounds). Three springs SP' of the nature described above (and shown in FIGS. 26 and 33) are also provided. Each spring SP' is a medium die spring (250 pounds). All surfaces of the tool holder block CB (except the internal walls of the hydraulic lines HL through which the hydraulic fluid flows), and all surfaces of the face plate MP, are nitrided. Each seating member 50 is a wedge member of nylon 66 with 20% glass filler. These exemplary features, of course, are by no means required or limiting to the invention.

Figure 22:
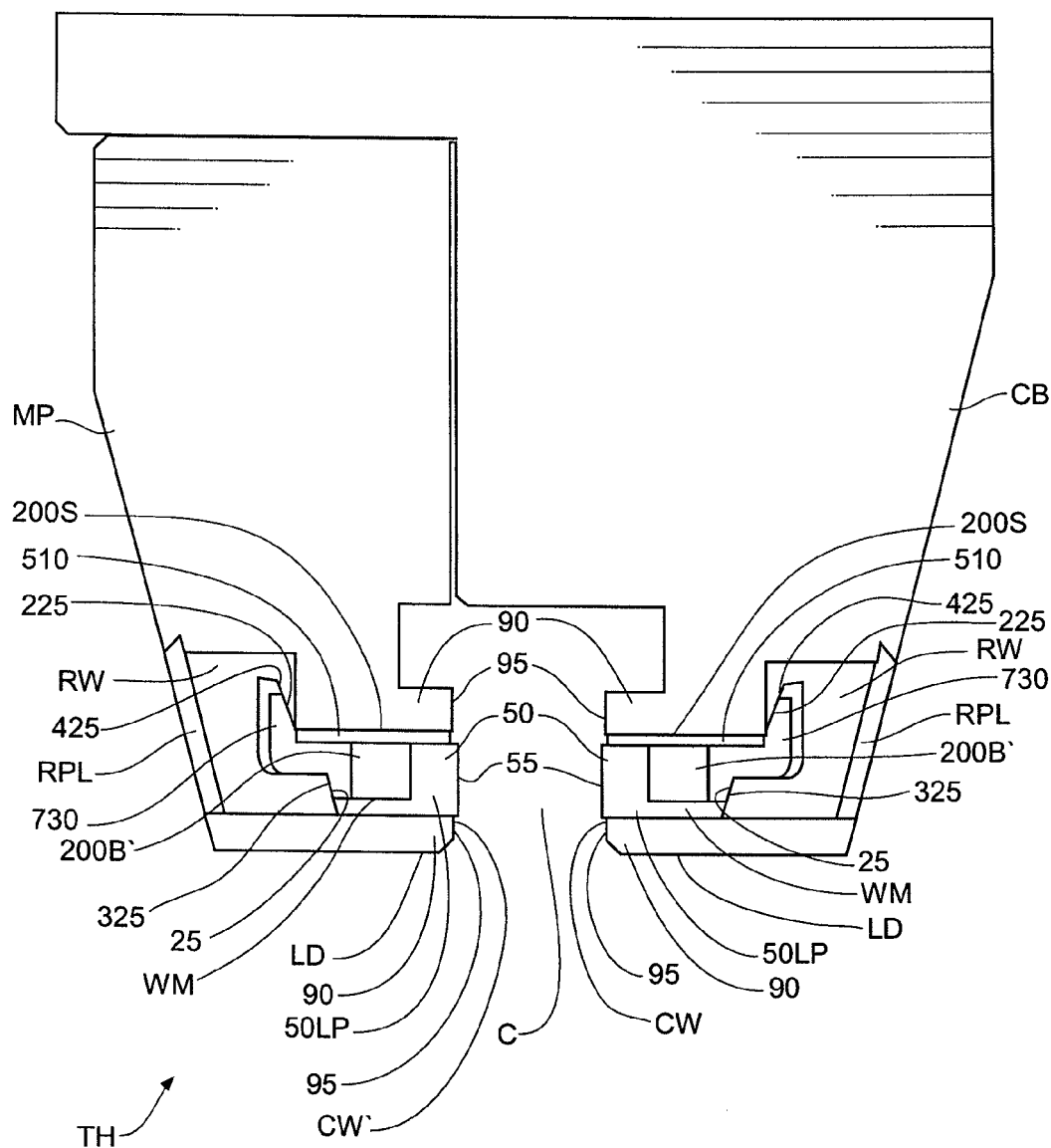
FIG. 22 is a partially broken-away cross-sectional side view of a tool holder in accordance with certain embodiments of the invention.
Figure 23:
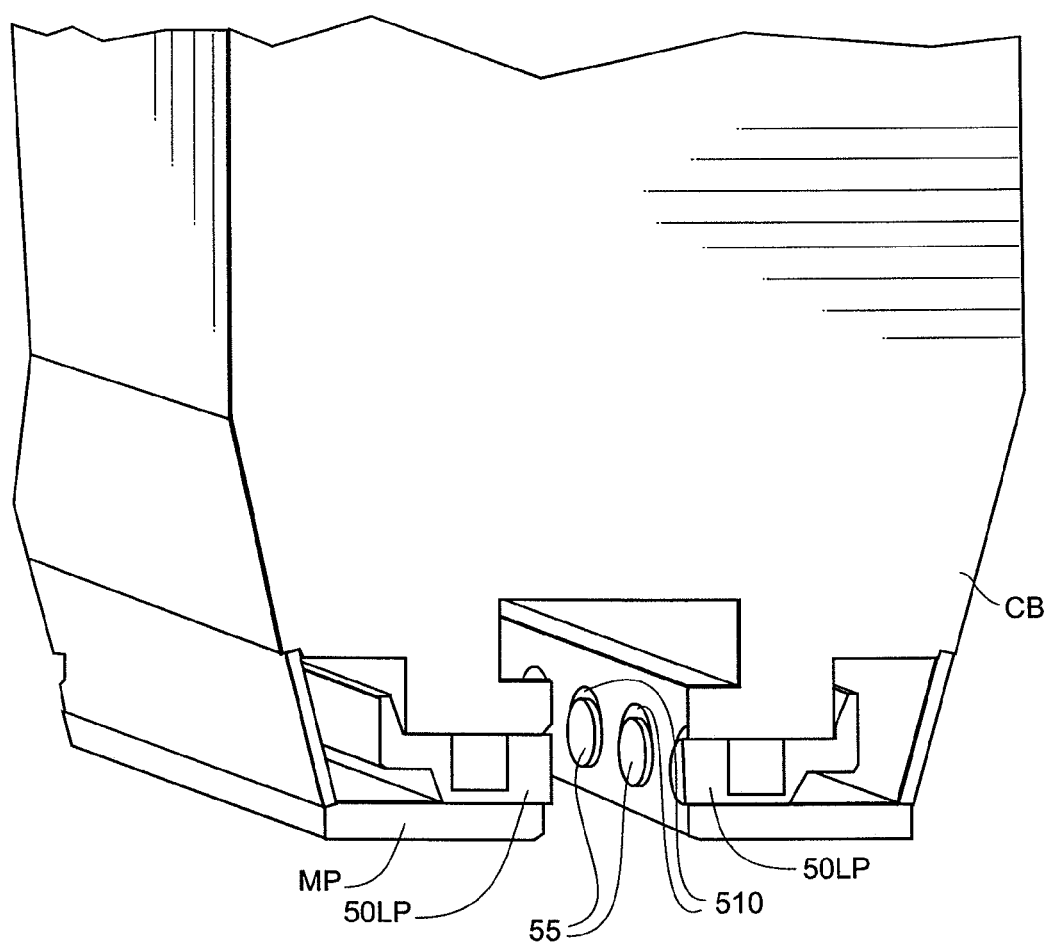
FIG. 23 is a partially broken-away cross-sectional perspective view of the tool holder of FIG. 22.

FIGS. 22 and 23 depict one of the embodiments wherein the tool holder TH includes seating members 50 on both sides of the tool-mount channel C. Here, the seating members are pin-like wedge members. In this embodiment, each wedge member (or "lifting wedge") WM has a camming surface 325 that is adapted to cam with a corresponding cam surface 25 of the tool holder TH. Here, the cam surfaces 25 are defined by retaining wedges RW adjacent to respective ones of the wedge members WM. Each cam surface 25, 325 is at an oblique angle relative to the contact surfaces 55 of the wedge members WM (and relative to clamping surface 95 of the tool holder). Thus, when the shank of a tool is positioned in the tool-mount channel C and the moveable plate MP is moved toward the tool holder block CB (so as to close the wedge members WM on opposite sides of the tool's shank), each retaining wedge RW forces a wedge member WM to undergo a camming action with such retaining wedge. This camming action involves each wedge member WM moving to a higher elevation conjointly with the tool. In more detail, as the contact surfaces 55 of the wedge members 50 close upon the tool's shank, the cam surfaces 25 of the retaining wedges RW bear forcibly against the respective camming surfaces 325 of the wedge members WM. As the moveable plate MP continues moving closer to the tool holder block CB, each pair of these engaged surfaces 25, 325 cam with each other. This causes the lifting wedges WM to move upwardly (together with the tool) relative to the tool holder block CB. This provides the desired tool seating functionality whereby simply closing the tool holder on the shank of a tool results in the tool being operably seated in the tool holder (such that the load-delivering surface(s) of the tool holder is/are engaged with corresponding load-receiving surface(s) of the tool).

Due to the limited freedom of movement of the lifting wedges WM in the bore 510 (as well as the restrictive mechanical coupling of each lifting wedge WM with its corresponding retaining wedge RW), the occurrence of any rocking of the wedge members WM is minimized or eliminated during use. In FIGS. 22 and 23, each lifting wedge WM actually has two camming surfaces 325, 225 adapted respectively to cam with two corresponding cam surfaces 25, 425 of a retaining wedge RW. In another embodiment, the separate retaining wedges are eliminated by forming the tool holder block CB and the moveable plate MP so that integral parts of these bodies CB, MP define the same cam surfaces 25, 425 as the retaining wedges RW in FIGS. 22 and 23.

In FIGS. 22 and 23, the contact surface 55 of each wedge member WM has a circular shape (see FIG. 23). This is by no means required. However, providing the wedge members in the form of pin-like bodies can be advantageous. For example, each pin-like wedge member WM in FIGS. 22 and 23 has a leading portion 50LP with a cross section that is circular. This can be advantageous in that the openings 510 can be formed as cylindrical bores.

In other embodiments, though, each seating member 50 is a wedge member WM with a leading portion having a rectangular cross section. Reference is made to FIG. 11.

Figure 16:
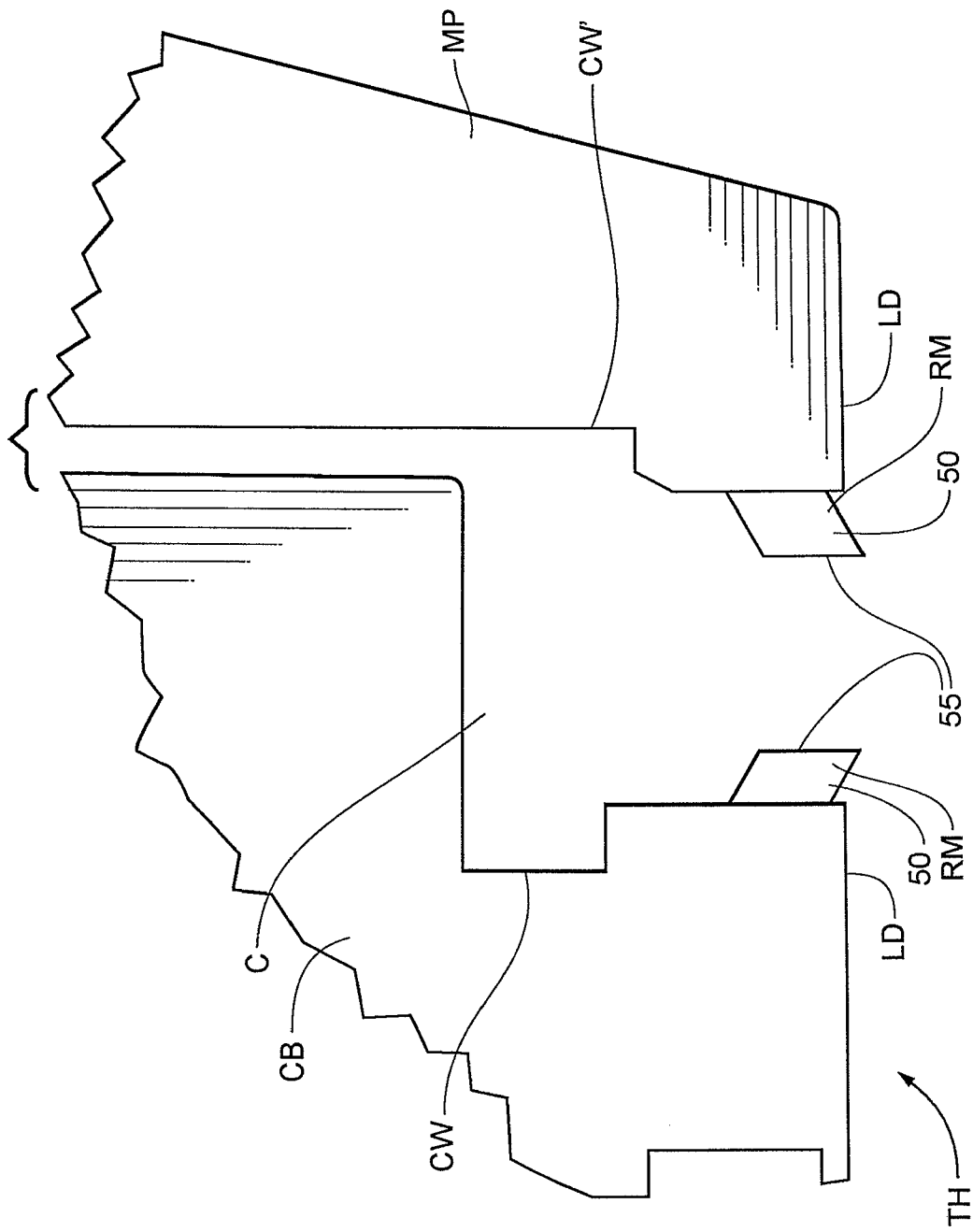
FIG. 16 is a partially broken-away side view of a tool holder in accordance with certain embodiments of the invention.
Figure 17:
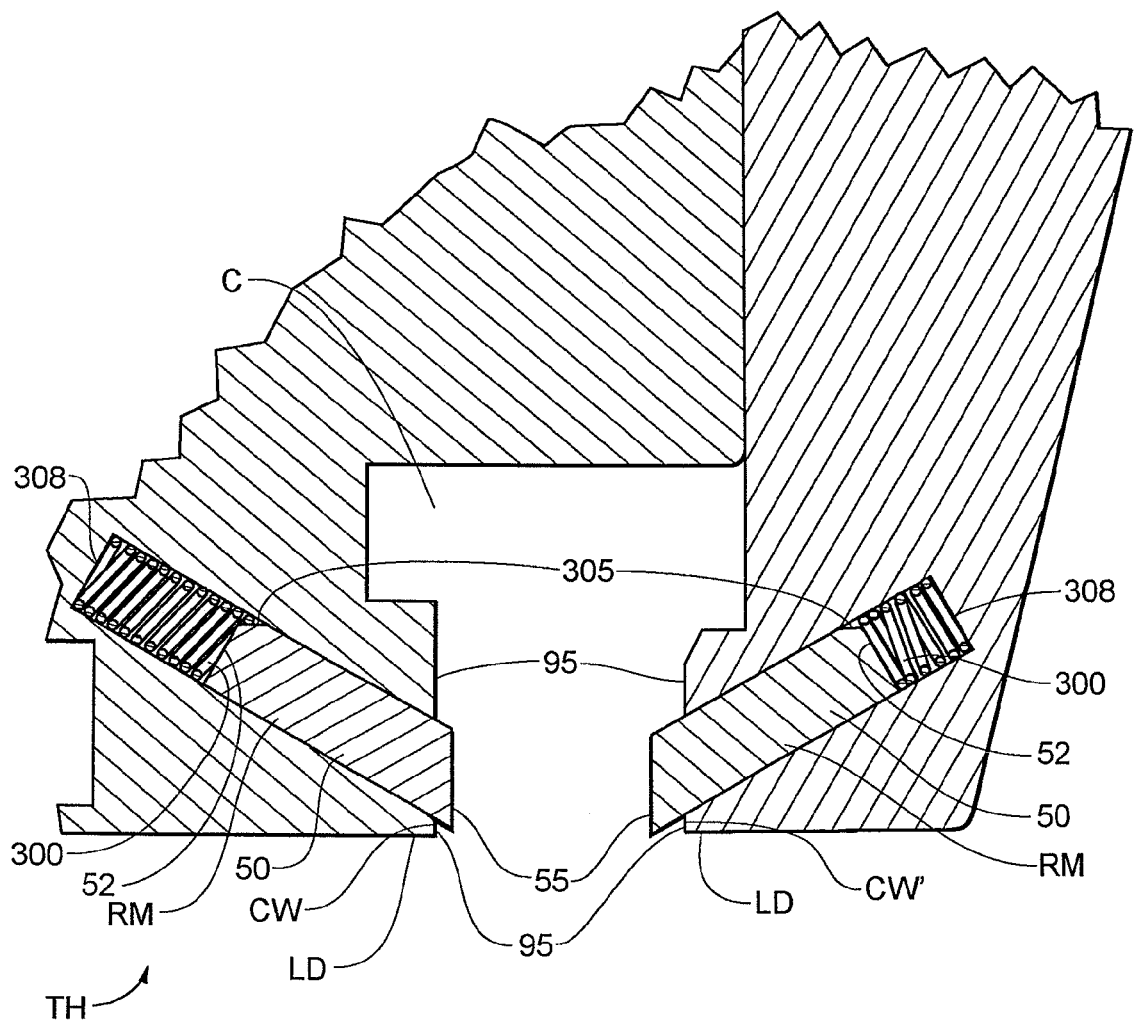
FIG. 17 is a partially broken-away cross-sectional side view of a tool holder in accordance with certain embodiments of the invention.

FIGS. 16 and 17 depict embodiments wherein the tool holder TH is provided with seating members 50 that comprise (e.g., are) rod members RM. Each illustrated rod member RM is moveable between first and second positions. Preferably, each rod member RM is resiliently biased towards its first position by a spring member 300. FIG. 17 depicts one manner in which spring members 300 can be used to resiliently bias such rod members RM. Here, each rod member RM is mounted in a bore 305 so as to be slidable (e.g., axially) between first and second positions. In the embodiment of FIG. 17, each bore 305 is a blind opening defined by the tool holder TH, although this is not required. A spring 300 is positioned between the rear end 52 of each illustrated rod member and a tool holder surface 308. In FIG. 17, this surface 308 defines the blind end of the bore 305.

With continued reference to FIGS. 16 and 17, each rod member RM has a contact surface 55 that is adapted to engage the shank of a tool. When the tool's shank is positioned in the channel C and the first wall CW' is initially moved toward the second wall CW, the rod members RM are pressed against the tool's shank due to the bias of the springs 300. Thereafter, as the first wall CW' continues moving closer to the second wall CW, the rod members RM are prevented from moving relative to the tool's shank by friction between the contact surfaces 55 and the tool's shank. This continued movement of the first wall CW' toward the second wall CW results in the rod members being forced further into their respective bores 305. As the rod members RM retract further into the bores 305, the tool's shank moves conjointly with the rod members until each load-receipt surface of the tool comes into direct contact with a load-delivery surface of the tool holder. At this point, engagement of the load-bearing surfaces of the tool and tool holder prevents further conjoint movement of the rod members and the tool's shank. Continued movement of the first wall CW' toward the second wall CW preferably causes the rod members RM to retract even further into the bores 305 until the tool holder's clamping surfaces 95 come to bear fully upon opposite sides of the tool's shank. At this point, the tool is rigidly clamped in its operative position.

Figure 18:
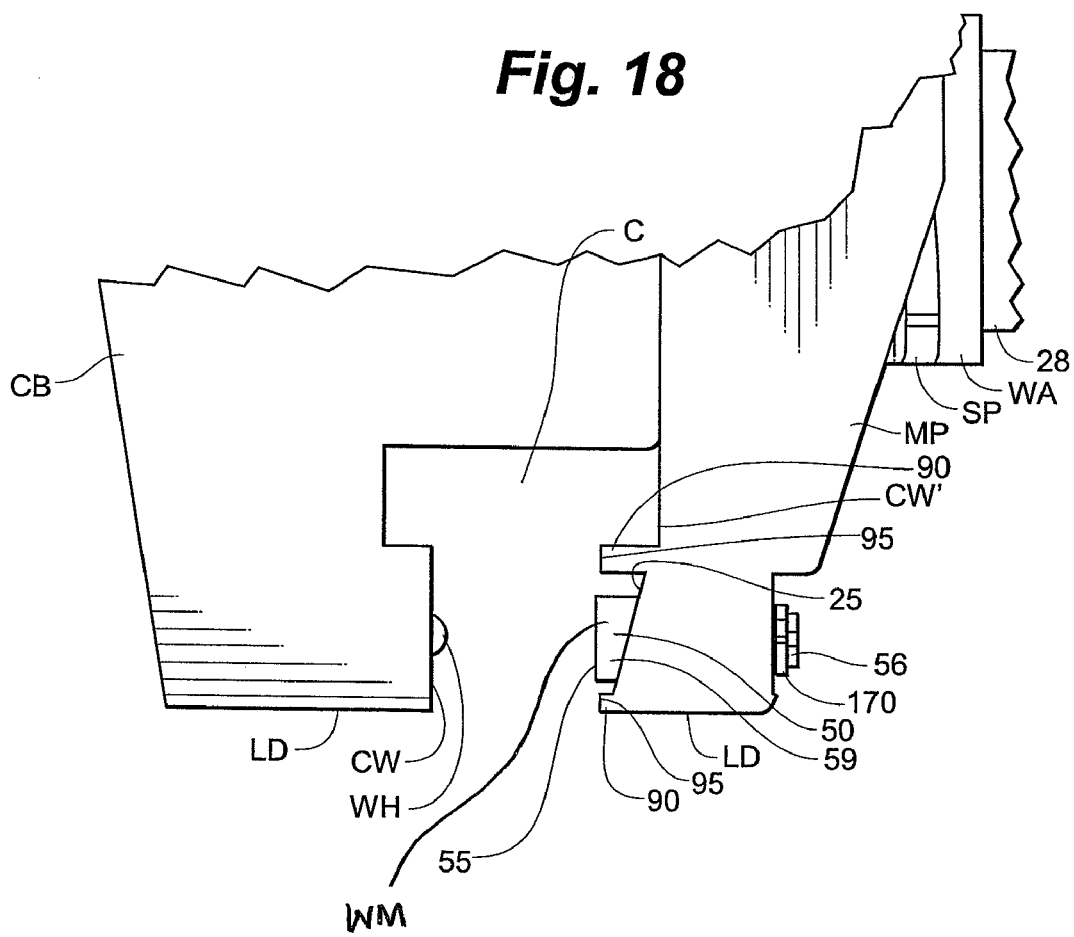
FIG. 18 is a partially broken-away side view of a tool holder in accordance with certain embodiments of the invention.
Figure 20:
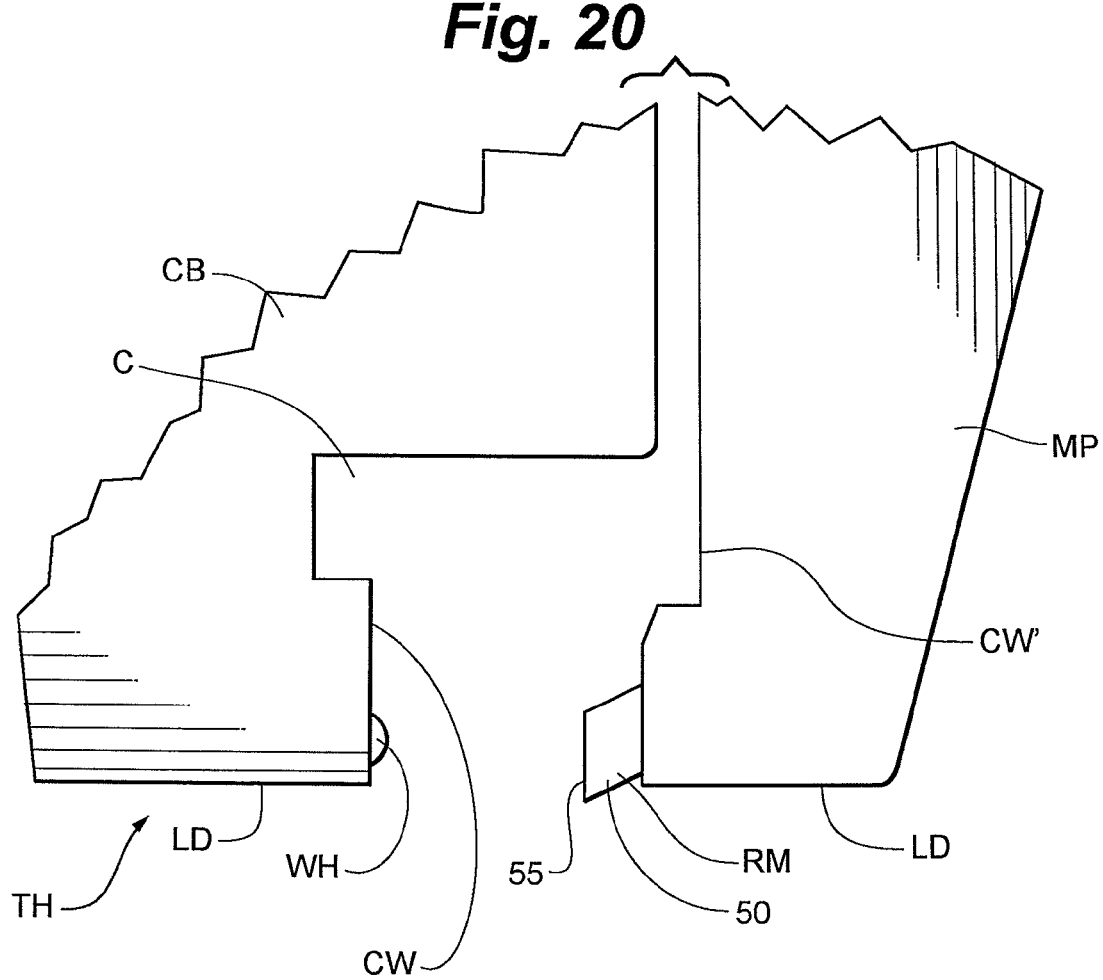
FIG. 20 is a partially broken-away side view of a tool holder in accordance with certain embodiments of the invention.
Figure 21:
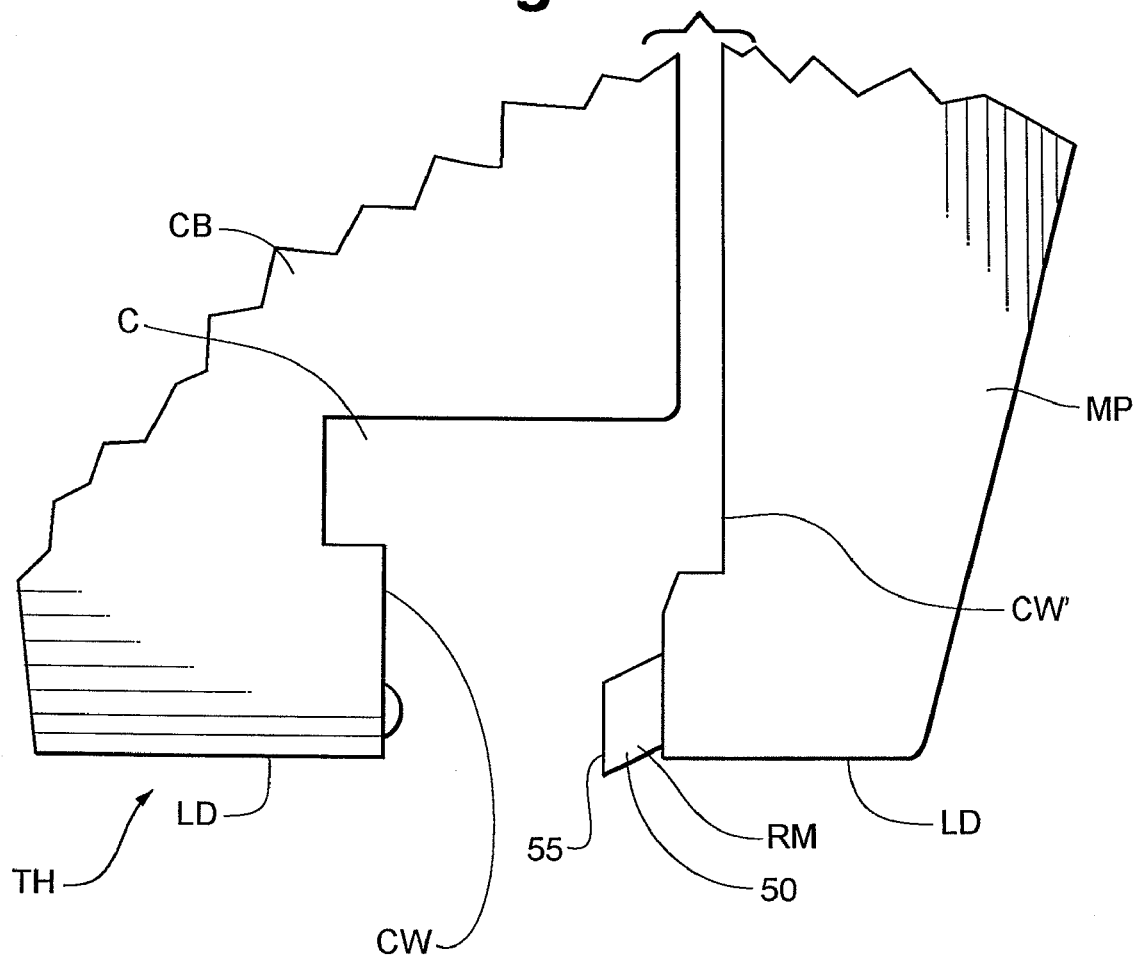
FIG. 21 is a partially broken-away side view of a tool holder in accordance with certain embodiments of the invention.

Embodiments have been described wherein the tool holder includes confronting wedge members. Embodiments have also been described wherein the tool holder includes confronting rod members. In other embodiments, a wheel member WH is provided on one of the confronting walls, while a wedge member or rod member is provided on the other confronting wall. Reference is made to FIGS. 18 and 20. The wedge member or rod member can deliver frictional force to one side of a tool's shank such that the tool is moved (e.g., upwardly) in the tool-mount channel. As the tool moves in this manner, the other side of its shank can ride along the rotating wheel member WH until the tool reaches its fully seated position. Embodiments of this nature can involve a plurality of wheel members positioned along one of the confronting walls, while the other confronting wall can have a plurality of wedge members and/or rod members. Each wheel member WH, when provided, preferably retracts (optionally overcoming the resilient bias of one or more springs) into an opening in the tool holder when the first and second walls clamp fully upon the shank of a tool.

Thus, the tool holder TH can be provided with one or more seating members 50 of various different designs. In one group of embodiments, the tool holder includes at least one seating member having at least one part (optionally the whole seating member) comprising (optionally consisting essentially of) a polymer, optionally together with a filler. One useful polymer is nylon, such as nylon 66. Torlon or ultra high molecular weight polyethylene may also be suitable. If so desired, the polymer can comprise a filler to provide increased hardness, increased durability, and/or decreased flexibility. Glass fibers are an advantageous filler (e.g., nylon 66 with 20% glass filler has given good results). Other useful fillers may include fumed silica or talc.

The invention provides a group of embodiments wherein the seating members 50 are formed of one material while the tool holder block CB and/or the face plate MP (when provided) are formed of another (different) material. The block CB and/or the face plate MP, for example, can comprise (e.g., consist essentially of) metal (e.g., steel) while the seating members 50 can comprise (e.g., consist essentially of) a polymer, optionally together with a filler. Thus, the contact surfaces 55 (which preferably directly contact, and lift, the tool when the tool holder closes on the tool's shank) of one or more seating members 50 on the tool holder can optionally be defined by a polymer.

In one group of embodiments, the tool holder TH is provided with at least one coating over at least one surface. In some embodiments of the present group, a coating is provided on one or more (optionally on each) of the tool holder's clamping surfaces 95. Additionally or alternatively, a coating can be provided over a surface 409 of the tool holder block CB, and this surface 409 is one that slides relative to a coated surface TS of the face plate MP during the closing and opening action of the tool holder. In some preferred embodiments, the tool holder block CB and/or the face plate MP are provided with a coating over at least a majority of the surface area (optimally over all surface area except those surfaces defining any internal hydraulic lines through which hydraulic fluid may flow). The coating can be provided to increase surface hardness, to increase lubricity, and/or to otherwise protect against wear, corrosion, sticking, and/or galling.

When provided, the coating can optionally be a dry lubricant coating. For example, the coating can comprise nickel (e.g., nickel alloy) and/or a low friction polymer. In some cases, the coated surface has one or more of the following features: (i) a coefficient of static friction below 0.35, below 0.3, or even below 0.2; (ii) a coefficient of dynamic friction below 0.3, below 0.25, below 0.18, or even below 0.1. Suitable dry lubricant coatings are available commercially from, for example, General Magnaplate Corporation (Linden, N.J., USA) and Poeton Industries, Ltd. (Gloucester, England). As one example, the coating can be a NEDOX® coating.

In one subgroup of the present embodiments, the coating comprises a nitride and/or a carbide. One commercially available nitride coating is the Nitrex® coating, which is a high endurance surface enhancement available commercially from Nitrex, Inc. (Aurora, Ill., USA). Particularly useful nitriding and nitrocarburizing enhancements are described in U.S. Pat. No. 6,327,884, the entire teachings of which are incorporated herein by reference.

Nitriding and nitrocarburizing processes are known in the field and need not be described in great detail. Reference is made to U.S. Pat. Nos. 4,790,888 and 4,268,323, the salient teachings of which regarding such enhancements are incorporated herein by reference. The latter patent refers to the use of a fused salt bath to enable nitrogen and carbon to diffuse into the surface of a steel piece suspended in the bath to form a carbonitride case. Reference is made also to U.S. Pat. No. 5,234,721 (referring to methods of forming carbonitride coatings), the salient teachings of which regarding such coatings are incorporated herein by reference.

Nitriding processes, both plasma (ion) nitriding and liquid nitriding, are described in detail in the ASM Handbook prepared under the direction of the ASM International Handbook Committee, Revised vol. 4: *Heat Treating*, pp. 410-424 (1994), the relevant teachings of which concerning nitriding enhancements are incorporated herein by reference. Plasma or ion nitriding involves the use of glow discharge technology to provide nascent nitrogen to the surface of a heated steel part. Here, the part is subjected to a nitrogen plasma in a vacuum chamber. Nascent nitrogen diffuses into the surface of the part to form an outer "compound" zone containing $\gamma$ ($Fe_4N$) and $\epsilon$ ($Fe_{2.3}N$) intermetallics, and an inner "diffusion" zone which may be described as the original core microstructure with some solid solution and precipitation strengthening. Liquid nitriding involves immersing a steel part in a molten, nitrogen-containing fused salt bath containing cyanides or cyanates, e.g., NaCN or NaCNO. Tool components can be enhanced by liquid nitriding through a wide variety of commercial coating manufacturers, such as Metal Treaters Inc. of St. Paul, Minn., USA.

In some embodiments, the tool holder is adapted for use with a tool having a shank one side of which is provided with one or more wheel members. The tool holder in these embodiments can have one or more wedge members and/or rod members on one of the confronting walls, while the other confronting wall has no seating members. Reference is made to FIG. 19. The one or more wedge members and/or rod members can deliver frictional force to one side of the tool's shank such that the tool is moved (e.g., upwardly) in the tool-mount channel, and as the tool moves in this manner the wheel member(s) on the other side of the tool's shank can ride along the confronting wall that is devoid of seating members until the tool reaches its fully seated position. In embodiments of this nature, each wheel member preferably retracts (optionally overcoming the resilient bias of one or more springs) into an opening in the tool when the first and second walls of the tool holder clamp fully upon the shank of the tool.

In certain embodiments, the tool holder TH includes an actuator A that is hydraulic. In some of these embodiments, the tool holder TH includes a hydraulic line HL, optionally provided in the form of a bore extending through the body (e.g., a block CB) of the tool holder. In some cases, the hydraulic line HL is adapted for use at pressures in excess of about 1,000 psi, such as between about 1,000 psi and about 5,000 psi, and perhaps optimally between about 3,500 psi and about 5,000 psi (or 3,000-4,000 psi). In certain related method embodiments, the method comprises delivering hydraulic fluid pressurized at 1,000 psi or more through the hydraulic line HL and into a hydraulic reservoir 145 of the tool holder TH, with the result that the tool holder is actuated (e.g., moved to its open configuration or to its closed configuration).

In certain embodiments, the invention provides methods of operating a press brake. For example, certain embodiments provide a method of mounting a press brake tool on a tool holder having a tool-mount channel bounded by two spaced-apart confronting walls. In some of these embodiments, the confronting walls have clamping surfaces for engaging and clamping a shank of the tool therebetween as a first of the walls is moved toward a second of the walls. Preferably, the tool holder TH is adapted for moving the tool TL when operatively mounted on the tool holder along a pressing axis PA. In the present method, the tool holder has confronting movable seating members 50 disposed on opposite sides of the tool-mount channel C. The method comprises positioning the tool's shank S in the tool-mount channel C, moving the first wall CW' toward the second wall CW such that the seating members 50 engage opposite sides of the tool's shank, and moving the thus engaged seating members together with the tool's shank in a direction (e.g., upwardly) at least generally parallel to the tool holder's pressing axis PA. During this conjoint movement of the seating members 50 and the tool's shank S, the first wall CW' preferably continues moving closer to the second wall CW. In some cases, the method further comprises clamping the tool's shank S between the tool holder's clamping surfaces 95 after a cessation of the conjoint movement of the seating members 50 and the tool's shank S (which cessation optionally occurs when load-bearing surfaces LD, LR of the tool and tool holder come into engagement). The first wall CW' optionally continues to move toward the second wall CW until the clamping surfaces 95 of the tool holder TH engage and clamp the tool's shank S, whereupon the clamping surfaces preferably apply to the tool's shank a force that is at least substantially perpendicular to the tool holder's pressing axis PA. In some embodiments of this nature, the force applied by the clamping surfaces 95 to the shank S is substantially (or entirely) devoid of a seating component directed parallel to the tool holder's pressing axis PA.

In some cases, the whole first wall CW' is moveable toward (at least part of) the second wall CW during the closing action of the tool holder. In other cases, only part of the first wall (or a component that is extendable from it) moves toward the second wall. In one example, a pin or block is extendable from the first wall so as to force a tool's shank against the second wall, which has one or more seating members (optionally lifting wedges). Other useful variants will be apparent to people skilled in this area of technology given the present teaching as a guide. Thus, the first wall of the tool holder can be moved toward the second wall in different ways, i.e., the whole wall can move, part of the wall can move, a component extendable from the first wall can move, etc.

In some embodiments of the present method, the tool-mount channel C opens toward a workpiece location WL, and the conjoint movement of the seating members 50 and the tool shank's S is directed away from the workpiece location.

In certain embodiments, the tool holder TH comprises a load-delivery surface LD, the tool TL includes a load-receipt surface LR, and the movement of the first wall CW' toward the second wall CW causes the seating members 50 once engaged with the tool's shank S to move together with the shank in the desired direction (which is at least generally parallel, and preferably is substantially parallel, to the pressing axis) until the load-receipt surface of the tool comes into direct contact with the load-delivery surface of the tool holder. As noted above, each seating member 50 can optionally have a contact surface 55 that is at least generally planar and remains oriented at least generally perpendicular to the load-delivery surface LD throughout the movement of the first wall CW' toward the second wall CW.

Optionally, in the present method, each seating member has a vertical contact surface and the confronting seating members are mounted on the tool holder such that their vertical contact surfaces are confronting surfaces that respectively engage opposed vertical side surfaces of the tool's shank during movement of the first wall toward the second wall. Here, the conjoint movement of the seating members and the tool's shank preferably is caused by the confronting vertical contact surfaces delivering frictional force (e.g., static frictional force) to the opposed vertical contact surfaces of the tool's shank. In some embodiments of this nature, the conjoint movement of the seating members and the tool's shank is upward vertical movement.

Preferably, in the present method, the seating members 50 bear against, and cam with, respective cam surfaces 25 of the tool holder TH during the conjoint movement of the seating members and the tool's shank S. Each cam surface 25 can optionally be defined by a slanted or curved wall section of the tool holder TH. When the seating members 50 cam with such surfaces, the camming involves the seating members sliding along the respective cam surfaces.

In certain embodiments of the present method, a first of the seating members is mounted on the first confronting wall CW', a second of the seating members is mounted on the second confronting wall CW, the first seating member moves relative to the first confronting wall during the conjoint movement of the seating members and the tool's shank, and the second seating member moves relative to the second confronting wall during the conjoint movement of the seating members and the tool's shank. Optionally, during the conjoint movement of the seating members 50 and the tool's shank S, each seating member moves from a first position to a second position and in the process undergoes a change in vertical position.

In some embodiments, during the conjoint movement of the seating members and the tool's shank, at least part of a first of the seating members slides along a slanted first cam surface of the tool holder and at least part of a second of the seating members slides along a slanted second cam surface of the tool holder.

In some preferred embodiments of the present method, each seating member 50 is mounted on the tool holder TH so as to be moveable between first and second positions, and each seating member is resiliently biased (optionally by one or more spring members) toward the first position. The conjoint movement of such seating members together with the tool's shank S preferably involves each seating member moving from the first position to the second position (in the process overcoming the noted resilient bias). In some embodiments of this nature, for example, the tool-mount channel C opens toward a workpiece location WL, and movement of each seating member 50 from the first position to the second position involves each seating member moving further away from the workpiece location. In one embodiment of this nature, a plurality of seating members 50 are mounted along a longitudinal length of the tool holder's first confronting wall CW', a plurality of seating members 50 are mounted along a longitudinal length of the tool holder's second confronting wall CW, and during the movement of the first wall CW' toward the second wall CW all of the seating members move further away from the workpiece location WL.

In the present method, at least one of the seating members 50 optionally comprises a wedge member at least a portion of which is carried alongside a cam surface 25 of the tool holder TH. Preferably, this cam surface bears against, and cams with, the wedge member during at least some of the movement of the first wall CW' toward the second wall CW. Such a wedge member can, for example, be mounted on the tool holder TH so as to be moveable between first and second positions, such that during the camming of the wedge member and the cam surface 25 the wedge member moves from its first position to its second position by virtue of at least a portion of the wedge member (e.g., a camming surface thereof) sliding along the cam surface.

In certain preferred embodiments of the present method, the seating members 50 comprise wedge members that bear against, and cam with, respective cam surfaces 25 of the tool holder TH (e.g., during at least some of the movement of the first wall CW' toward the second wall CW). For example, in response to the movement of the first wall CW' toward the second wall CW such wedge members preferably sandwich the tool's shank S and in the process deliver frictional force to the tool's shank. In embodiments of this nature, the frictional force optionally is oriented in a desired direction and causes the tool's shank S to move relative to the tool holder's cam surfaces 25 until a load-receipt surface LR of the tool TL engages a load-delivery LD surface of the tool holder TH. The frictional force can be a static frictional force during the conjoint movement of the tool's shank and wedge members. In some cases, the conjoint movement of the shank and wedge members (as well as the static frictional force) ceases once the load-bearing surfaces of the tool and tool holder come into engagement. In such cases, further movement of the first wall CW' closer to the second wall CW preferably results in the wedge members being forced to move (e.g., due to camming of the wedge members and tool holder's cam surfaces) relative to the then stationary shank S of the tool. This relative movement optionally results in dynamic friction force (optionally oriented in an upward vertical direction) being applied by the wedge members to the tool's shank. Movement of the first wall CW' toward the second wall CW preferably ceases when clamping surfaces 95 of the tool holder engage and clamp opposite sides of the tool's shank. At this stage, the tool will preferably be in its operatively mounted position.

One particular method of operation will now be described with reference to FIGS. 14 and 15. The illustrated tool TL is initially lifted up into the tool holder's channel C until an engagement portion 580 of the tool's retractable safety key SK snaps into a safety recess SR defined by the tool holder TH. At this point, the operator can let go of the tool TL and the safety key SK will keep the tool from falling out of the tool holder's channel C (by virtue of the safety key's engagement portion 580 resting on a safety shelf SCS defined by the tool holder TH). It will be appreciated that during the initial step of lifting the tool's shank S into the tool holder's channel C, the tool holder is retained in its open configuration. In the present embodiment, this is accomplished by virtue of pressurized hydraulic fluid in the actuator A holding the moveable face plate MP in its open position. To then close the illustrated tool holder TH, the hydraulic pressure in the actuator A is reduced so as to allow the springs SP to move the plate MP toward the tool holder's laterally-stationary block CB, in other words moving the first confronting wall CW' toward the second confronting wall CW. As the first wall CW' moves toward the second wall CW, the vertical contact surfaces 55 of the illustrated seating members 50 engage the tool's shank S. At this stage, static friction between the seating members 50 and the shank S prevents relative movement between the seating members and the shank. As the first wall CW' continues moving toward the second wall CW, the seating members 50 cam with the slanted cam surfaces 25. This camming action forces the seating members 50 to move upwardly, and the static friction between the seating members and the shank S causes the tool TL to move upwardly along with the seating members. This conjoint upward movement continues until the upwardly-facing horizontal load-receipt surfaces LR of the tool TL come into contact with the downwardly-facing horizontal load-delivery surfaces LD of the tool holder TH. At this point, further upward movement of the tool is prevented. As the first wall CW' continues to move further toward the second wall CW, the seating members 50 continue to cam with the slanted cam surfaces 25, causing the seating members to continue moving upwardly. In the process, the vertical contact surfaces 55 of the seating members 50 slide upwardly along the tool's shank S, thus applying an upward dynamic friction force to the shank. This continues until the vertical clamping surfaces 95 of the tool holder TH engage and clamp the tool's shank S, at which point the seating members 50 will have moved fully into the recesses 70 defined by the tool holder TH. This results in the tool being fully clamped in its operative position. This method, however, is merely one particular embodiment of the invention.

While preferred embodiments of the present invention have been described, it is to be understood that numerous changes, adaptations, and modifications can be made to the preferred embodiments without departing from the spirit of the invention and the scope of the claims. Thus, the invention has been described in connection with specific embodiments for purposes of illustration. The scope of the invention is described in the claims, which are set forth below.

What is claimed is:

1. A tool holder for a press brake having a pressing axis, the tool holder having two spaced-apart confronting walls bounding a tool-mount channel, the tool holder having a moveable seating member mounted on one of said confronting walls, the seating member being movable in a direction at least generally parallel to the pressing axis relative to said one confronting wall, the seating member having a contact surface that comes into direct contact with a side of the tool's shank during a closing of the tool holder on the tool's shank, the contact surface being defined at least in part by a polymer.

2. The tool holder of claim 1 wherein the seating member consists essentially of the polymer and a filler.

3. The tool holder of claim 1 wherein the contact surface once moved into direct contact with the side of the tool's shank delivers a force to the tool's shank, the force being oriented in a seating direction at least generally opposed to the tool holder's pressing direction.

4. The tool holder of claim 3 wherein the force is a frictional force.

5. The tool holder of claim 4 wherein the frictional force is the only force oriented in said seating direction applied by the seating member to the tool when the tool's shank is received in the tool-mount channel and the confronting walls of the tool holder are clamped upon the tool's shank.

6. The tool holder of claim 1 wherein the confronting walls have clamping surfaces for engaging and clamping the tool's shank therebetween, said clamping surfaces being defined by steel over which coating is provided.

7. The tool holder of claim 1 wherein the tool holder is adapted to move the tool along the pressing axis when the tool is operatively mounted on the tool holder.

8. A tool holder for a press brake having a pressing axis, the tool holder having two spaced-apart confronting walls bounding a tool-mount channel, the tool holder having a moveable seating member mounted on one of said confronting walls, the seating member having a contact surface that comes into direct contact with a side of the tool's shank during a closing of the tool holder on the tool's shank, the contact surface being defined at least in part by a polymer, wherein the tool holder has a cam surface and the seating member has a camming surface to bear against, and cam with, the cam surface of the tool holder, the camming surface of the seating member being defined at least in part by a polymer.

9. The tool holder of claim 8 wherein the camming surface of the seating member is at an oblique angle relative to the contact surface of the seating member.

10. The tool holder of claim 8 wherein the cam surface of the tool holder is defined by steel over which coating is provided.

11. The tool holder of claim 10 wherein said coating comprises nitrogen and/or carbon.

12. The tool holder of claim 8 wherein the cam surface of the tool holder is defined by a wall section of the tool holder.

13. The tool holder of claim 12 wherein the wall section of the tool holder is one or more of being slanted and curved.

14. A tool holder for a press brake having a pressing axis, the tool holder having two spaced-apart confronting walls bounding a tool-mount channel configured for receiving a shank of the tool, the tool holder including moveable seating members and respective cam surfaces, the seating members disposed on opposite sides of the tool-mount channel to engage opposite sides of the tool's shank and to move together with the shank in a direction at least generally parallel to the tool holder's pressing axis in response to a first of said two walls moving toward a second of said two walls, wherein the seating members are to bear against, and cam with the respective cam surfaces of the tool holder during said conjoint movement of the seating members and the tool's shank, the cam surfaces of the tool holder being defined by bodies comprising a first material, the seating members comprising a second material, wherein the first and second materials are different.

15. The tool holder of claim 14 wherein the first material comprises steel, and wherein the seating members are formed of material having a lesser hardness than the steel.

16. The tool holder of claim 14 wherein the second material comprises a polymer.

17. The tool holder of claim 16 wherein the seating members consist essentially of the polymer and a filler.

18. The tool holder of claim 14 wherein the cam surface of the tool holder is defined by a wall section of the tool holder.

19. The tool holder of claim 18 wherein the wall section of the tool holder is one or more of being slanted and curved.

20. A tool holder for a press brake having a pressing axis, the tool holder having two spaced-apart confronting walls bounding a tool-mount channel configured for receiving a shank of the tool, the walls having clamping surfaces for engaging and clamping the tool's shank therebetween, the clamping surfaces of the tool holder being defined by metal over which coating is provided wherein the tool holder includes moveable seating members disposed on opposite sides of the tool-mount channel, the seating members being adapted to engage opposite sides of the tool's shank and to move together with the shank in a direction at least generally parallel to the tool holder's pressing axis in response to a first of said two walls moving toward a second of said two walls.

21. The tool holder of claim 20 wherein the clamping surfaces of the tool holder are defined by steel over which the coating is provided.

22. The tool holder of claim 20 wherein said coating comprises nitrogen and/or carbon.

23. The tool holder of claim 20 wherein an entirety of a first of said two walls is adapted to move relative to a second of said two walls.

24. The tool holder of claim 20 wherein the seating members comprise a polymer.

25. The tool holder of claim 24 wherein the seating members consist essentially of the polymer and a filler.

26. A tool holder for a press brake having a pressing axis, the tool holder having two spaced-apart confronting walls bounding a tool-mount channel, the tool holder having a moveable seating member and a cam surface, the seating member mounted on one of said confronting walls and having a contact surface to directly contact a side of the tool's shank, the seating member having a camming surface to bear against, and cam with, the cam surface of the tool holder, the cam surface of the tool holder being defined by metal over which coating is provided.

27. The tool holder of claim 26 wherein the cam surface of the tool holder is defined by steel over which coating is provided.

28. The tool holder of claim 26 wherein the camming surface of the seating member is defined at least in part by a polymer.

29. The tool holder of claim 28 wherein the seating member consists essentially of the polymer and a filler.

30. The tool holder of claim 26 wherein the camming surface of the seating member is at an oblique angle relative to the contact surface of the seating member.

31. The tool holder of claim 26 wherein the coating comprises nitrogen and/or carbon.

32. The tool holder of claim 19 wherein the cam surface of the tool holder is defined by a wall section of the tool holder.

33. The tool holder of claim 32 wherein the wall section of the tool holder is one or more of being slanted and curved.

* * * * *